United States Patent
Shibamiya et al.

(10) Patent No.: US 7,633,642 B2
(45) Date of Patent: Dec. 15, 2009

(54) APPARATUS THAT INDICATES TO THE USER IN ADVANCE WHETHER PRINTING IS PERMITTED FOR DIGITAL BROADCAST VIDEO CONTENT

(75) Inventors: Yoshikazu Shibamiya, Tokyo (JP); Atsushi Mizutome, Miura-gun (JP)

(73) Assignee: Canon Kabushiki Kaisha, Tokyo (JP)

(*) Notice: Subject to any disclaimer, the term of this patent is extended or adjusted under 35 U.S.C. 154(b) by 808 days.

(21) Appl. No.: 11/140,919

(22) Filed: Jun. 1, 2005

(65) Prior Publication Data

US 2005/0270602 A1  Dec. 8, 2005

(30) Foreign Application Priority Data

Jun. 8, 2004 (JP) .............................. 2004-169801
Apr. 22, 2005 (JP) .............................. 2005-124784

(51) Int. Cl.
*G06F 15/00* (2006.01)
(52) U.S. Cl. ...................... 358/1.15; 358/1.1; 358/1.18; 358/527; 725/133; 725/141; 715/719; 715/720; 348/460; 348/553; 348/569
(58) Field of Classification Search ................ 348/460, 348/552, 553, 473, 569; 714/57; 725/133, 725/141, 153; 710/8, 10–12; 358/1.11–1.18, 358/527, 1.1; 715/719, 720
See application file for complete search history.

(56) References Cited

U.S. PATENT DOCUMENTS

| | | | | |
|---|---|---|---|---|
| 6,310,651 B1 | 10/2001 | Mizutome | ............. | 348/459 |
| 6,774,951 B2* | 8/2004 | Narushima | ............. | 348/552 |
| 6,789,962 B2* | 9/2004 | Matsunaga et al. | ............. | 400/70 |
| 7,009,724 B1* | 3/2006 | Ihara et al. | ............. | 358/1.15 |
| 7,079,191 B1* | 7/2006 | Kitamura et al. | ............. | 348/552 |
| 7,385,719 B2* | 6/2008 | Ohno et al. | ............. | 358/1.15 |
| 7,446,816 B2* | 11/2008 | Tomita et al. | ............. | 348/552 |
| 7,493,529 B2* | 2/2009 | Kubota et al. | ............. | 714/57 |
| 2001/0028408 A1* | 10/2001 | Arima | ............. | 348/460 |
| 2002/0062487 A1* | 5/2002 | Ohno et al. | ............. | 725/133 |
| 2002/0133815 A1 | 9/2002 | Mizutome et al. | ............. | 725/9 |
| 2003/0107773 A1* | 6/2003 | Takamine et al. | ............. | 358/296 |
| 2004/0095316 A1 | 5/2004 | Shibamiya et al. | ............. | 345/156 |
| 2005/0078334 A1 | 4/2005 | Hisatomi et al. | ............. | 358/1.15 |

FOREIGN PATENT DOCUMENTS

| | | |
|---|---|---|
| EP | 0 618 723 A1 | 10/1994 |
| JP | 10-164521 A | 6/1998 |
| JP | 2001-86452 A | 3/2001 |
| JP | 2001-320637 A | 11/2001 |
| WO | 1 085 740 A2 | 3/2001 |
| WO | WO 03/084222 | 10/2003 |

* cited by examiner

*Primary Examiner*—Kimberly A Williams
(74) *Attorney, Agent, or Firm*—Fitzpatrick, Cella, Harper & Scinto

(57) ABSTRACT

A signal processing apparatus that receives data-broadcasting data and video data for displaying a motion picture. An output circuit is provided for outputting data while a moving image is displayed, wherein the data indicate that a printing-allowed image will be displayed later.

5 Claims, 21 Drawing Sheets

CONFIGURATION OF
CAPTURE-PRINTING CONTROL INFORMATION
ITEMS

CONTENTS IN FIRST EMBODIMENT

| CAPTURE-PRINTING CAPABILITY |
|---|
| CONTROL METHOD |
| PRINTING-POSSIBLE DATE 1 |
| MESSAGE 1 |
| MESSAGE 2 |
| MESSAGE 3 |
| OTHER INFORMATION |
| PRINTING-ALLOWED STARTING TIME 1 |
| PRINTING-ALLOWED DURATION TIME 1 |
| |

⋮

| PRINTING-ALLOWED STARTING TIME n |
|---|
| PRINTING-ALLOWED DURATION TIME n |
| |

| CAPABILITY |
|---|
| STREAM-ALLOWED FLAG |
| |
| CAPTURE-PRINTING OF THIS PROGRAM IS POSSIBLE — |
| THIS PROGRAM APPROXIMATELY 20 MINUTES AFTER STARTING — |
| CAPTURE-PRINTING IMMEDIATELY BECOMES POSSIBLE — |
| |
| 00:00:2002 |
| 00:00:1510 |
| |

⋮

| |
|---|
| |
| |

CONFIGURATION OF CAPTURE FILE
AT SAVING

| NAME OF PRINT FILE |
| --- |
| NAME OF PROGRAM |
| CAPTURE TIME |
| PRINTING-ALLOWED INFORMATION |
| OTHER INFORMATION |
| CAPTURE DATA |

*Fig.8*

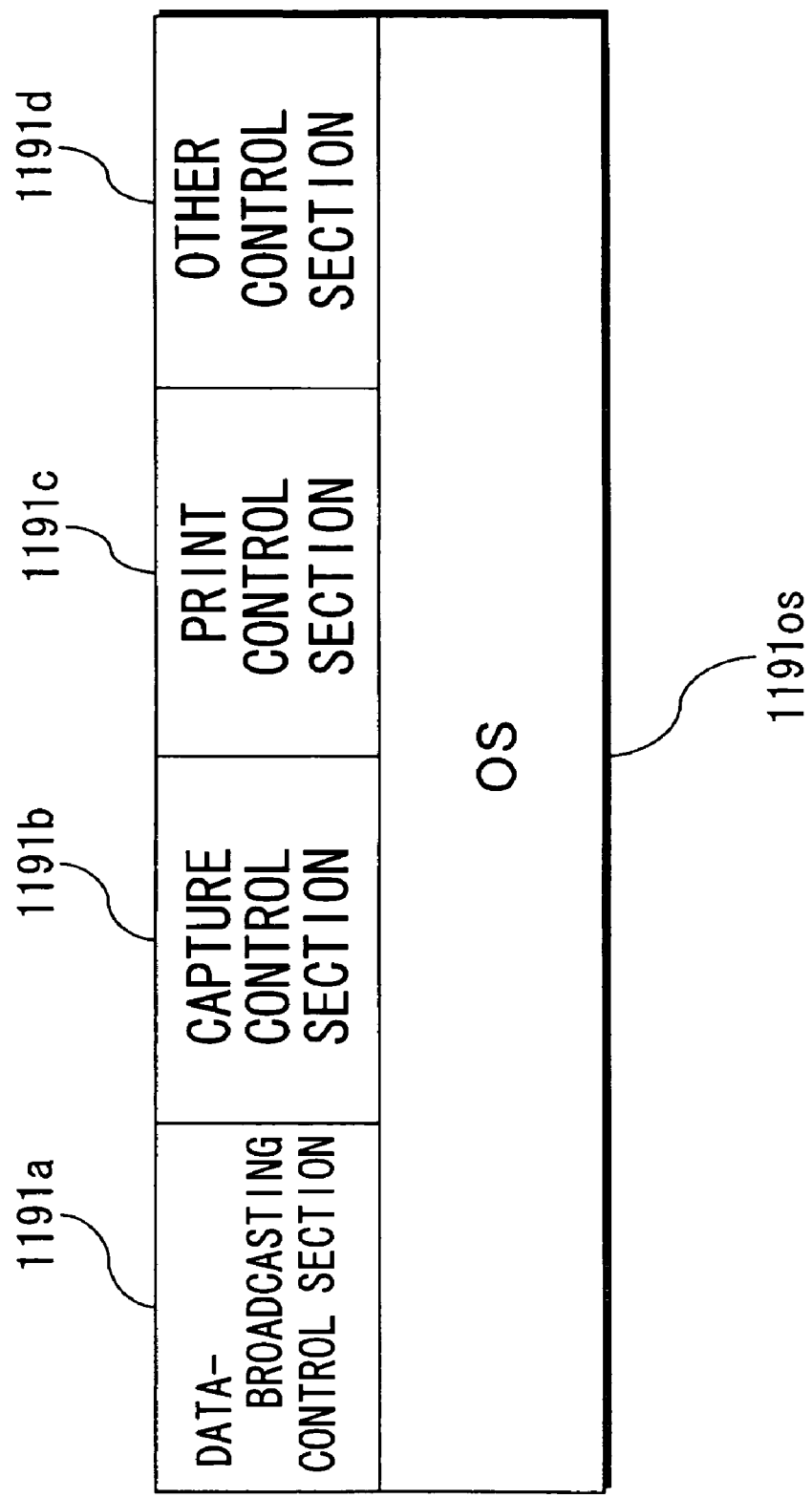

AFTER DELETING MESSAGE

CAPTURE-PRINTING ALLOWED SCENES

SCREENS AT CAPTURE OPERATIONS

OPERATION SCREENS AFTER SAVING

SEGMENT METADATA IN SECOND EMBODIMENT

| | | | | | | |
|---|---|---|---|---|---|---|
| REFERENCE PROGRAM | AATVcom/pops10 | AATVcom/pops10 | AATVcom/pops10 | AATVcom/pops10 | AATVcom/pops10 | AATVcom/pops10 |
| SEGMENT ID | S001 | S002 | S003 | S004 | S005 | S006 |
| TITLE OF SCENE | UCHIDA HIKARI | YOSHINO AKIKO | VENUS | VIVIDE VOA | SPECIAL | CATHARINE |
| OUTLINE OF SCENE | ○□△…□ | ×□×○○ | □□□△ | ○○××○ | ○×△△□ | △×△…□ |
| STARTING TIME | 00:03:5115 | 00:12:0514 | 00:22:0021 | 00:26:3656 | 00:33:2741 | 00:42:1803 |
| DURATION TIME | 00:06:0026 | 00:05:2104 | 00:04:3635 | 00:03:4501 | 00:03:4520 | 00:05:2103 |
| ALLOWED PRINT | No | No | Yes | Yes | No | No |
| OTHERS | ××□×○ | △○△□△ | △△△× | △××□ | ×□△○ | ○○…○ |

*Fig. 17*

APPARATUS THAT INDICATES TO THE USER IN ADVANCE WHETHER PRINTING IS PERMITTED FOR DIGITAL BROADCAST VIDEO CONTENT

BACKGROUND OF THE INVENTION

1. Field of the Invention

The present invention relates to a signal processing apparatus, an image display apparatus, and an image display method, and, more particularly, is preferably used for capture printing, by which video is captured for printing, in a display apparatus which receives and displays video data transmitted from a broadcasting station by, for example, broadcasting.

2. Description of the Related Art

Recently, there has been occurred a situation in which high-quality video can be easily viewed and videotaped because broadcasting through broadcasting satellites (BSs) and digital terrestrial broadcasting (ground digital broadcasting) were started. Moreover, there has occurred a situation in which various kinds of data is broadcast together with programs, and is easily processed in a receiving apparatus (hereinafter, called a TV set).

It has been considered that moving-picture video is enjoyed not only as a moving picture, but also as a printed matter which is made by nonmoving-picture capturing of a frame as a nonmoving image forming the moving picture and by printing the frame on a sheet member such as a piece of paper. It can be easily realized in current digital broadcasting that such a moving picture is captured and printed on a sheet member.

Furthermore, protection of right such as copyright has been strongly requested in digital broadcasting. Accordingly, it has been required to control the above-described capture printing. A method disclosed in Japanese Patent Publication No. 2001-86452 has been proposed as one of methods to control the capture printing. In the method described in Japanese Patent Publication No. 2001-86452, allowance or disallowance of printing and a number of printing are controlled, using a capture-printing control descriptor which is added to a header field of an video data. Moreover, Japanese Patent Publication No. 2001-86452 has also disclosed that printing-allowed scenes are automatically stored as a nonmoving picture and the stored nonmoving pictures are displayed as a list which is used for a user to select a nonmoving picture to be printed.

However, there is a case in which the larger number of the printing-allowed scenes requires the larger size of hardware in the method according to Japanese Patent Publication No. 2001-86452, because the printing-allowed scenes are automatically stored. Moreover, there has been a problem that printing-control information cannot be inconveniently presented to a user beforehand.

SUMMARY OF THE INVENTION

Accordingly, an object of the present invention is to provide a signal processing apparatus, an image display apparatus, and an image display method, by which better convenience and more convenient service can be given to a user by executing more convenient capture printing through a simpler configuration.

In order to achieve the above-described object, a first aspect of the present invention is a signal processing apparatus characterized in that the apparatus comprises: an output circuit for outputting data while a moving image is displayed, wherein the data indicate that a printing-allowed image will be displayed later.

A second aspect of the present invention is a receiving apparatus characterized in that the apparatus comprises: a display device for displaying an image; and an output circuit for outputting data while a moving image is displayed, wherein the data indicate that a printing-allowed image will be displayed on the display device later.

A third aspect of the present invention is a method for displaying image characterized in that the method comprises: an output step to output data while a moving image is displayed, wherein the data indicate that a printing-allowed image will be displayed later; and a presentation step to present that the printing-allowed image will be displayed later according to the output data.

As described above, services with better convenience can be provided according to this invention, because more convenient, and more secured capture-printing can be executed to improve the convenience of users.

BRIEF DESCRIPTION OF THE DRAWINGS

The invention, together with further advantages thereof, may best be understood by reference to the following description taken in conjunction with the accompanying drawings in which:

FIG. 7 is a view explaining a configuration of capture-printing control information according to the first embodiment of the invention;

FIG. 8 is a view explaining a saved capture file according to the first embodiment of the invention;

FIG. 9 is a view explaining the structure of a system control section according to the first embodiment of the invention;

FIG. 17 is a view explaining a segment metadata according to the second embodiment of the invention;

DESCRIPTION OF THE PREFERRED EMBODIMENTS

Figure 1:
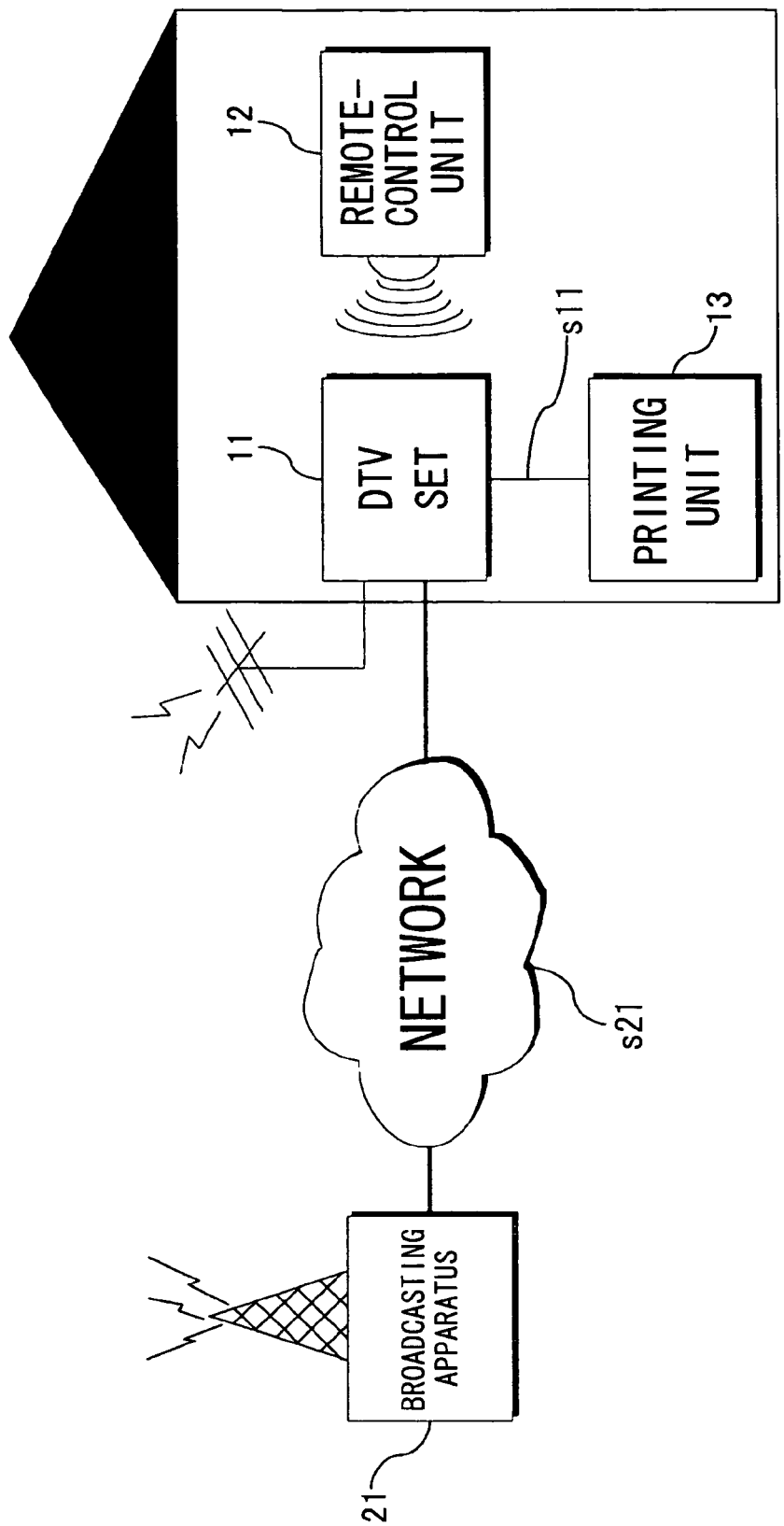
FIG. 1 is a view showing a whole system according to a first embodiment of the present invention.

Hereinafter, embodiments according to the present invention will be explained, referring to drawings. Here, the same reference numerals are applied to the same or corresponding components throughout the drawings in the following embodiments.

First Embodiment

In the first place, a transmit-receive system according to a first embodiment of the present invention will be explained. FIG. 1 shows a whole configuration of the transmit-receive system according to the first embodiment of the present invention.

As shown in FIG. 1, the transmit-receive system according to the first embodiment comprises: a TV set 11; a remote-control unit 12; a printer unit 13; and a broadcasting apparatus 21, wherein the broadcasting apparatus 21 are connected to the above apparatuses through a network s21.

The TV set 11 is configured to execute: television receive from a broadcasting station; display of video data, audio data, operation data, and the like; audio output; display of a screen captured by operation with the remote-control unit 12; and, control of printing in the printer unit 13, wherein the printing control will be described later.

The remote-control unit 12 is used when a TV viewer controls or operates the TV set 11, the printer unit 13, and the like. Moreover, the printer unit 13 is connected to the TV set 11 through the network s21. This printer unit 13 prints print data and the like of data broadcasting, based on a judgment caused by processing in the TV set 11 according to an instruction of an operator through the remote-control unit 12.

The network s21 is connected to the printer unit 13 and the like, and is used for transmit and receive of data and for control of the unit 13. Moreover, the broadcasting apparatus 21 broadcasts programs, television commercials, data-broadcasting data, program metadata, and the like, all of which have been produced, to TV viewers through radio waves and the Internet. Furthermore, the network s21, for example, the Internet is used as one means through which data is transmitted and received for data exchange between the broadcasting apparatus and the TV set.

Figure 2:
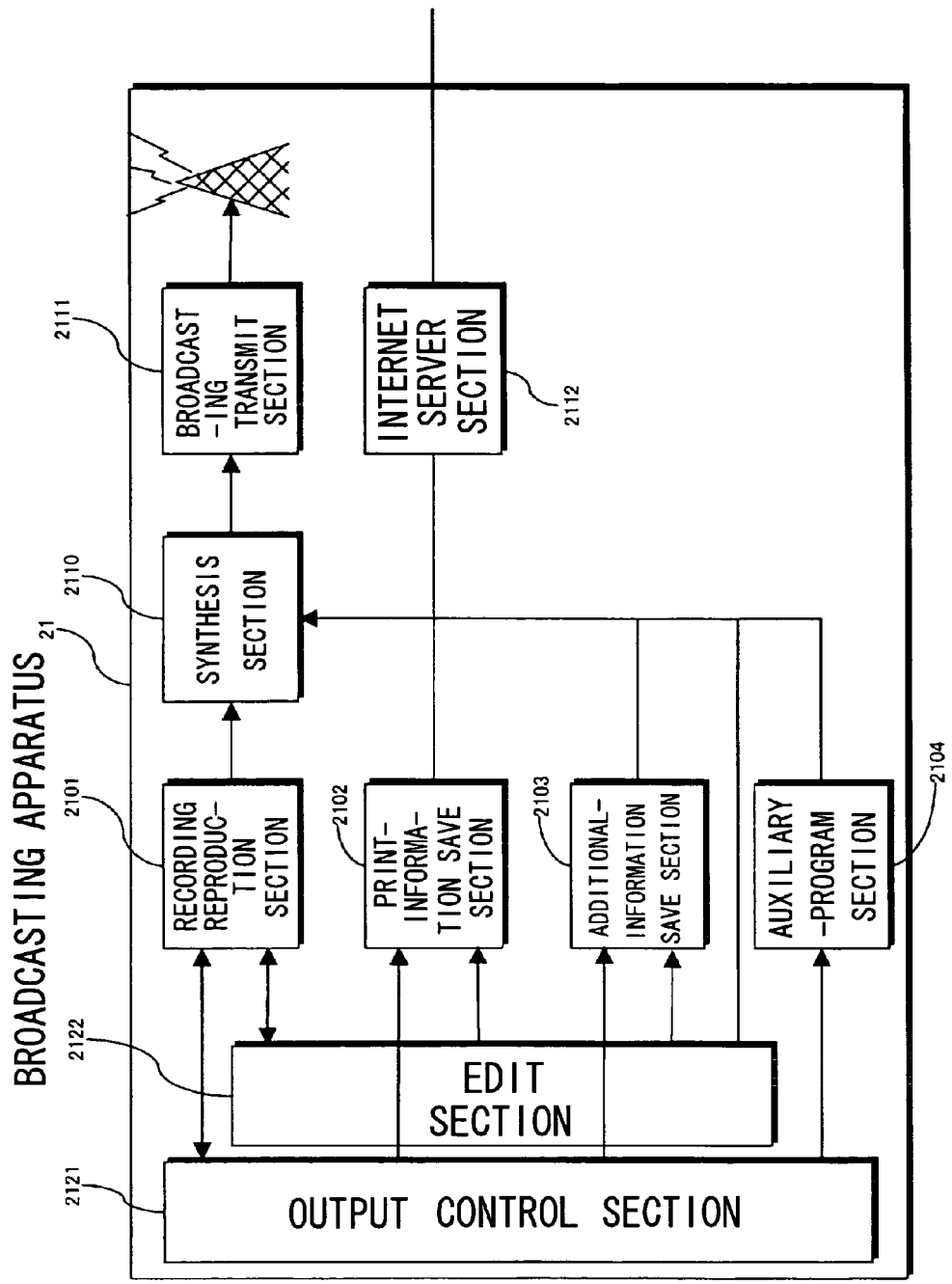
FIG. 2 is a block diagram showing details of a broadcasting apparatus according to the first embodiment of the invention.

FIG. 2 shows details of the broadcasting apparatus 21 according to the first embodiment. As shown in FIG. 2, the broadcasting apparatus 21 according to the first embodiment is configured to comprise: a recording reproduction section 2101; a print-information save section 2102; an additional-information save section 2103; an auxiliary-program section 2104; a synthesis section 2110; a broadcasting transmit section 2111; an Internet server section 2112; an output control section 2121; and an edit section 2122.

The recording reproduction section 2101 records video and audio data of a videotaped broadcasting program, which is used in this first embodiment. This video and audio data is edited by the edit section 2122. Then, the video and audio data, together with the after-described print information and additional information, is output at a specified time to the synthesis section 2110 by the output control section 2121. Here, the above-described program has a configuration shown in FIG. 3 and FIG. 6.

The print-information save section 2102 saves information on time during which capture printing is allowed in the above-described program. This print information is data which is output from the edit section 2122 when the program is edited.

The additional-information save section 2103 saves: various kinds of information on the program such as the name of the program, broadcasting time, names of performers, and the category of the program; information on a plurality of scenes into which data-broadcasting data and the program are divided; and the like.

The auxiliary-program section 2104 saves programs which are used in conjunction with programs such as television-commercial broadcasting.

The synthesis section 2110 packetizes program data reproduced in the recording reproduction section 2101 by embedding print information into the program data for division. Then, the packetized print information, together with packetized program information data from the additional-information save section 2103, is output as TS data to the after-described broadcasting transmit section 2111. This packetized TS data has a configuration shown in FIG. 3.

The broadcasting transmit section 2111 modulates and amplifies the packetized data so that the data can be output as broadcasting radio waves, and outputs the data from an antenna.

The Internet server section 2112 converts and saves required information among the above-described print information and additional information for output to the network s21, and outputs the required information corresponding to a request from the outside such as a TV viewer.

The output control section 2121 adequately controls the recording reproduction section 2101 storing programs, the print-information save section 2102 storing print information, the additional-information save section 2103 storing addition information and the auxiliary-program section 2104. The synthesis section 2110 transmits the above-described information. And the broadcasting transmit section outputs the information as broadcasting.

Figure 4:
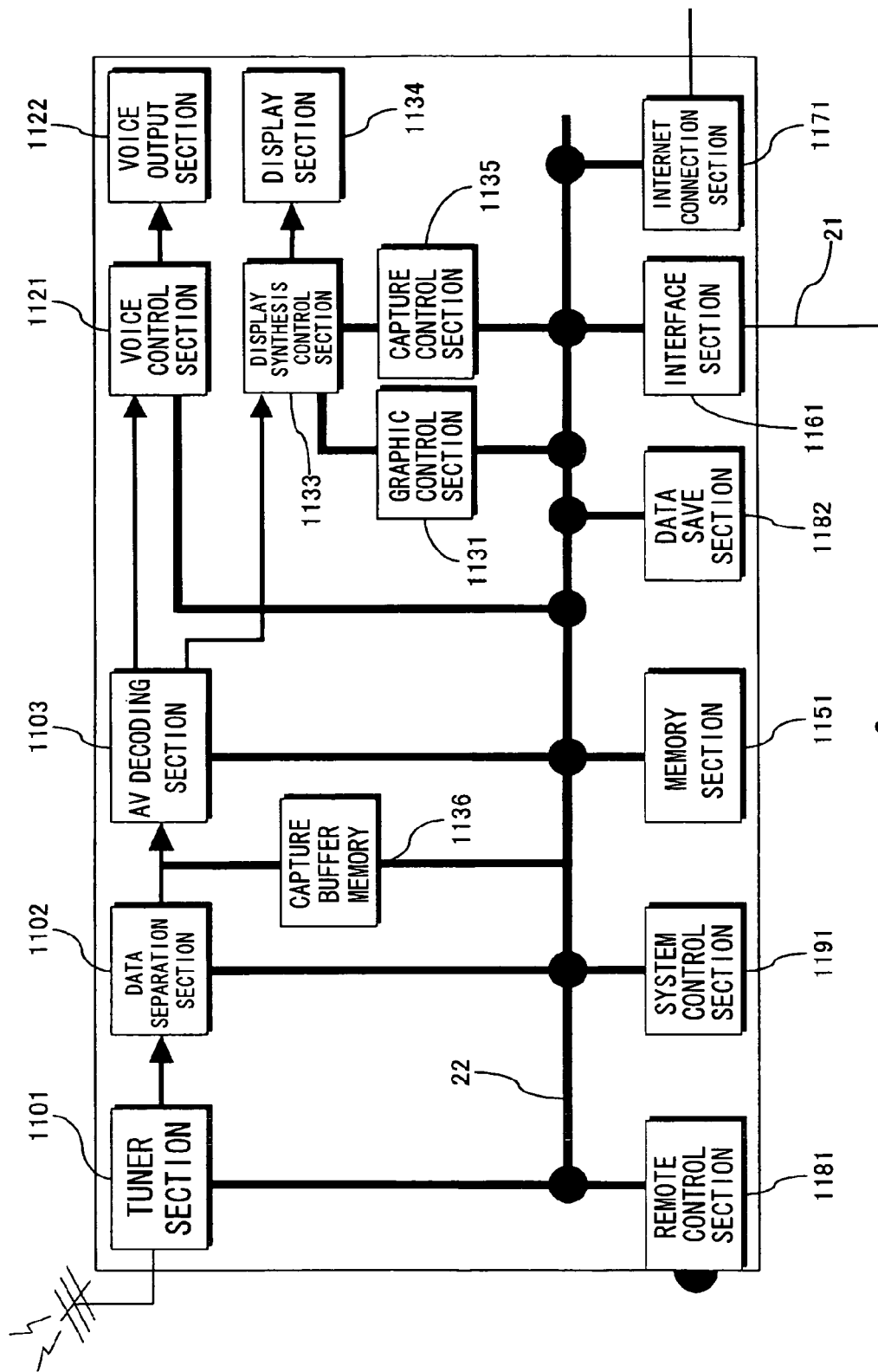
FIG. 4 is a block diagram showing details of a DTV set according to the first embodiment of the invention.

Subsequently, the TV set 11 will be explained. FIG. 4 shows details of the above-described TV set 11.

As shown in FIG. 4, in the first embodiment, the TV set 11 is configured to comprise: a tuner section 1101; a data separation section 1102; an AV decoding section 1103; a audio control section 1121; a audio output section 1122; a graphic control section 1131; a display synthesis control section 1133; a display section 1134; a capture control section 1135; a capture buffer memory 1136; a memory section 1151; a data save section 1182; an interface section 1161; an Internet connection section 1171; a remote control section 1181; a data save section 1182; and, a system control section 1191.

The tuner section 1101 amplifies a received high-frequency TV signal of TV broadcasting, selects a desired broadcasting station, and demodulates TS data which is obtained by synthesizing video and audio data of a program, data-broadcasting data, and other various kinds of data.

The data separation section 1102 separates: the above-described TS data into video/audio data of the program; program information data; program-control document data; print data; and other data for data broadcasting. Then, the video/audio program data, among these separated data, is supplied to the after-described AV decoding section 1103. Moreover, the program information data, the program-control document data, the print data, and other data are supplied to the memory section 1151 through an internal bus 22 for reserving.

The AV decoding section 1103 for video/audio broadcasting data decodes video/audio program data and television-commercial broadcasting data, all of which have been separated, and outputs the above-described data to the audio control section 1121 and the display synthesis control section 1133 as the elapsed time from the starting time of the program proceeds.

Moreover, the audio control section 1121 supplies audio data supplied from the above-described AV decoding section 1103 and the internal bus 22 to the after-described audio output section 1212 after the above-described data is switched and synthesized and audio volume, audio quality, realism and the like are controlled.

The audio output section 1122 amplifies a audio signal supplied from the above-described audio control section 1121, and outputs the signal as audio from a speaker.

The graphic control section 1131 generates a data broadcasting screen, an application screen in a TV system according to the present first embodiment, a graphical user interface (GUI) screen for a message, and the like, based on control by the after-described system control section 1191, and supplies the above-described screens to the after-described display-synthesis control section 1133.

The display synthesis control section 1133 executes switching, synthesizing, scaling (enlarging/reducing), other various kinds of conversions, correction, or the like of image data of programs supplied from the AV decoding section 1103 or image data of television-commercial broadcasting, and image data generated in the graphic control section 1131 according to control by the system control section 1991; and supplies the above-described image data to the after-described display section 1222.

This display synthesis control section 1133 comprises two planes of a data-broadcasting plane and an application plane, wherein the two planes can be controlled to independently be drawn from each other. Furthermore, the data-broadcasting plane of the two planes comprises a plurality of planes of a moving-picture plane, a nonmoving-picture plane, a character and pattern plane, and the like, wherein the plurality of planes can be independently controlled from one another, too. Here, an output circuit according to the present invention comprises the display synthesis control section 1133.

The display section 1134 is a display device which displays image data supplied from an image control section 1221.

Moreover, the same data as the data supplied from the above-described display synthesis control section 1133 to the display section 1222 is usually input to the capture control section 1135. Moreover, the data is overwritten in frames into frame memories in the capture control section 1135.

Furthermore, when an instruction signal is supplied from the after-described system control section 1191, and writing for one frame is completed, writing is interrupted, and the data is maintained. The memory data has a configuration in which a frame area is specified, based on the instruction signal from the system control section 1191, and the memory data can be read through the internal bus 22.

The capture buffer memory 1136 has a configuration in which video/audio data of a program can be maintained for, for example, 10 seconds. Moreover, while video/audio data is usually written one by one in a similar manner to that of the above-described capture control section 1135, writing is interrupted, and video/audio data is maintained after writing is executed in the capture control section 1135 for, for example, five seconds since writing is started to be maintained, based on an instruction signal from the system control section 1191. The system can read this maintained data through the internal bus 22.

The memory section 1151 is a memory section which saves the program information data, the program-control document, the print data, other data-broadcasting data, and the like, all of which have been separated in the above-described data separation section 1102. This memory section includes a work memory which is used in the system control section 1191 when a program is executed. Here, a storage section according to the present invention comprises the memory section 1151. The memory section 1151 also stores data indicate that a printing-allowed image is displayed. Since this data is stored in memory section 1151 previously, in order to indicate this data at predetermined time, it is omissible to acquire data from a predetermined section directly. Therefore, data can be indicated at more correct predetermined time.

The data save section 1182 is an auxiliary storage apparatus such as a non-volatile memory and a hard disk into which data such as program information data, program-control document, other data-broadcasting data, print data, captured data in the capture buffer memory 1136, charging control data, and view histories of viewers can be written for saving when an instruction is given by a viewer, or when it is judged to be required by the system.

The above-described printer unit 13 is connected to the interface section 1161, and is controlled by the TV set 11. According to the above-configuration, print data transmitted from the TV set 11 can be printed.

The Internet connection section 1171 is used when the TV set 11 is connected to a management server of a broadcasting station to transmit and receive program information data such as metadata, and various kinds of data such as charging information data for pay broadcasting. Moreover, received data is saved in the above-described memory section 1151, and, at the same time, is saved in the above-described data save section 1182 as required.

Moreover, the remote control section 1181 is a section which controls transmitting and receiving for remote control, using infrared rays, and has a configuration in which the section 1181 is operated by a TV viewer, and a control signal which the viewer desires can be transmitted. When data is transmitted and received for exchange between the remote control section 1181 and the remote-control unit 12, the data is transferred to the system control section 1191.

The system control section 1191 is configured to execute centralized control of the each sections in the TV set 11. This system control section 1191 comprises: a CPU; a main memory; a bus control section; a program reserving section; a parameter save section; an ID save section; a clock section; a timer section, and the like.

Moreover, when TV broadcasting is received, the above-described tuner section 1101 and the data separation section 1102 are controlled by the system control section 1191, according to which channels are switched to receive desired broadcasting radio waves and the after-described TS data is demodulated. Then, the program data, the program information data, the data-broadcasting data (a control document, print data, and the like) are separated from this TS data.

The program data is output to the AV decoding section 1103, and, at the same time, the program information data and the data-broadcasting data are reserved in the memory section 1151 through the internal bus 22.

Moreover, the program information data and the data-broadcasting data, which have been reserved, are analyzed in the system control section 1191, and information on access control including charging control and the like, and on programs is extracted to form data on an electronic program guide (EPG). Furthermore, a control document is detected in the data broadcasting data by the system control section 1191 to control data broadcasting and display.

Accordingly, when it is detected that nonmoving-picture capture printing is capable, captured time and contents are controlled to be displayed as a message according to the program-control document. Moreover, the Internet connection section 1171 is controlled to additionally receive program information and the like as required.

Moreover, the graphic control section 1131 is controlled by the system control section 1191 to display the above-described data-broadcasting, message, the GUI, applications in the TV set 11, messages, operation panels, and the like.

Moreover, the display synthesis control section 1133 is controlled by the system control section 1191 to synthesize video data output from the AV decoding section 1103 and image data from the graphic control section 1131, or to display various kinds of information on, for example, correction on the display section 1134. Similarly, the audio control section 1121 is controlled by the system control section 1191 to synthesize audio, and to control audio output to the audio output section 1122.

Moreover, the system control section 1191 reserves display data output from the above-described display synthesis control section 1133 in the capture control section 1135, and, at the same time, controls the capture buffer memory 1136 to control temporary save of program/video data.

According to a capture-printing instruction from a viewer through the remote-control unit 12 and the like, the capture control section is controlled to generate print data, to transfer the print data to the printer unit 13, and to control printing.

Moreover, data is transmitted and received for exchange between the remote-control units 12 and the TV set 11 to control the TV set 12, based on the data.

The Internal bus 22 is a data bus and a control bus, and is a bus which is in the TV set 11 and is used to transfer image and audio data, and information on all the sections as described above.

Figure 5:
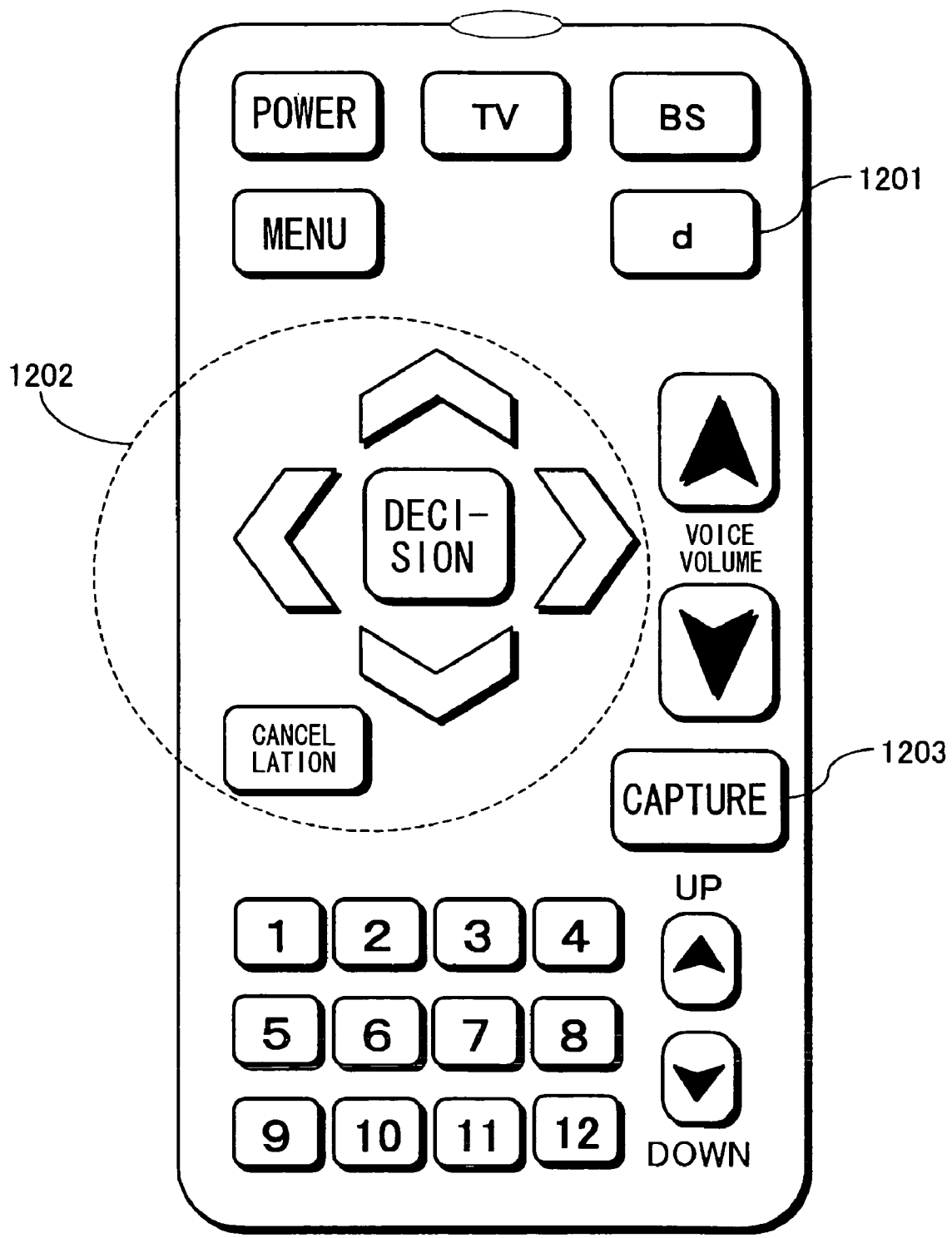
FIG. 5 is a schematic view showing details of a remote-control unit according to the first embodiment of the invention.

FIG. 5 shows details of the remote-control unit 12 used in this first embodiment. As shown in FIG. 5, the remote-control unit according to this first embodiment is provided with keys which are, for example, a power key, audio keys, channel keys, and are usually used when TV broadcasting is viewed. Moreover, the remote-control unit is also provided with: a data broadcasting key 1201 used for shift to data broadcasting (hereinafter, called "d key"); buttons for, for example, data broadcasting; keys 1202 such as a cursor decision key, wherein the keys 1202 operate an operation panel and the like; and the like. Furthermore, the remote-control unit 12 is provided with a capture button 1203 by which nonmoving-picture capturing of a display screen is executed.

Figure 3:
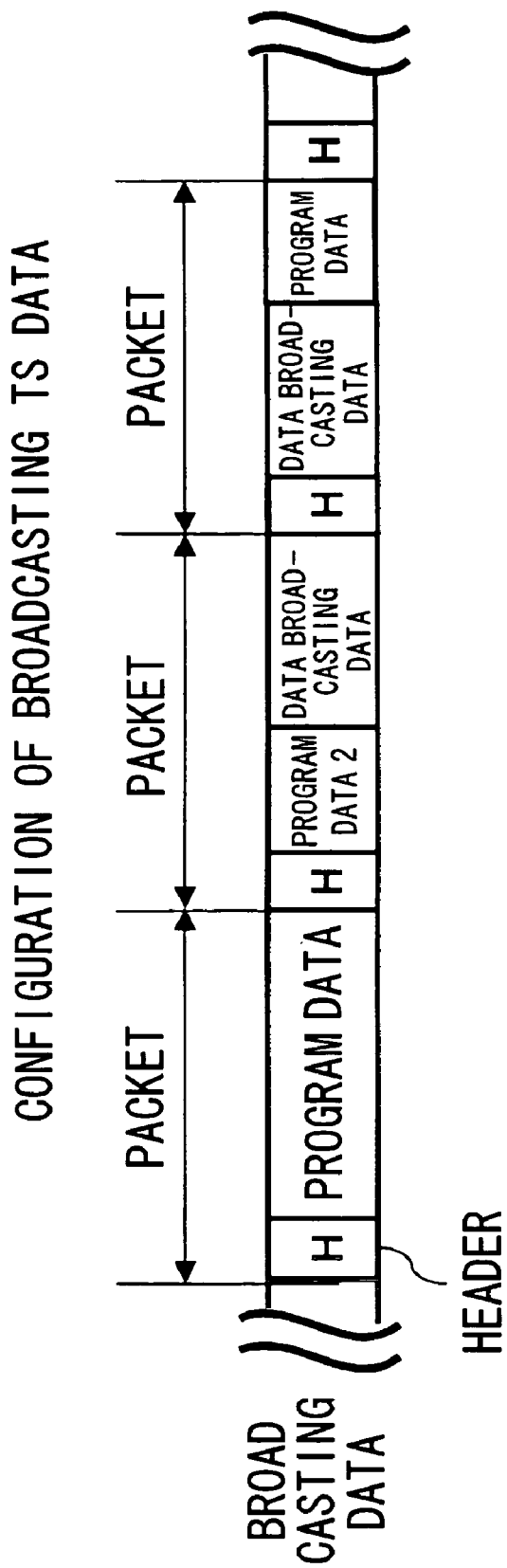
FIG. 3 is a view explaining broadcasting data according to the first embodiment of the invention.

The above-described drawing, FIG. 3, shows the contents of broadcasting data transmitted from a broadcasting station, so-called TS data. As shown in FIG. 3, the broadcasting data transmitted from the broadcasting station is made according to the broadcasting system, and standards of each country. The first embodiment will be described, assuming as one example that the broadcasting data is made according to standards (the standards of Association of Radio Industries & Businesses (ARIB)) for digital broadcasting in Japan.

That is, as shown in FIG. 3, the broadcasting data in this first embodiment has a configuration in which three fields of a header field, a program data field, and a data-broadcasting data field are packetized and are forwarded.

The header field comprises program information called so-called SI, and control information on other TS data. Moreover, the program data shows a program part forwarded as a so-called video/audio stream, that is, a program which a viewer views. In the TS data, a plurality of program data can be simultaneously forwarded. The data-broadcasting data comprises: detailed program information such as metadata related with programs; a control document which control display of programs and data broadcasting, data display, capture printing, and the like. Moreover, data for other programs, and data which is independent from a program are forwarded in some cases.

This control document is described as a bml document which is described in a contents description language bml. Moreover, the control document is analyzed immediately after receiving, and control is started. At the same time, the control document can be started and controlled by interrupt of an event including an instruction event from a broadcasting station, an interrupt event in time, an event caused by a specific remote control key, and the like.

Moreover, displayed data includes: moving picture data; nonmoving picture data; audio data; character data, and the like. The displayed data also includes presentation of allowance or disallowance of capture printing, starting time, and remaining time, and the like.

In these kinds of broadcasting data, program data is forwarded only once along the program broadcasting time, but data-broadcasting data is forwarded according to a so-called data carousel method by which the same data is repeatedly forwarded several times. The above-described data are packetized and, furthermore, a header field is added to the above-described data to form a broadcasting TS data.

Figure 6:
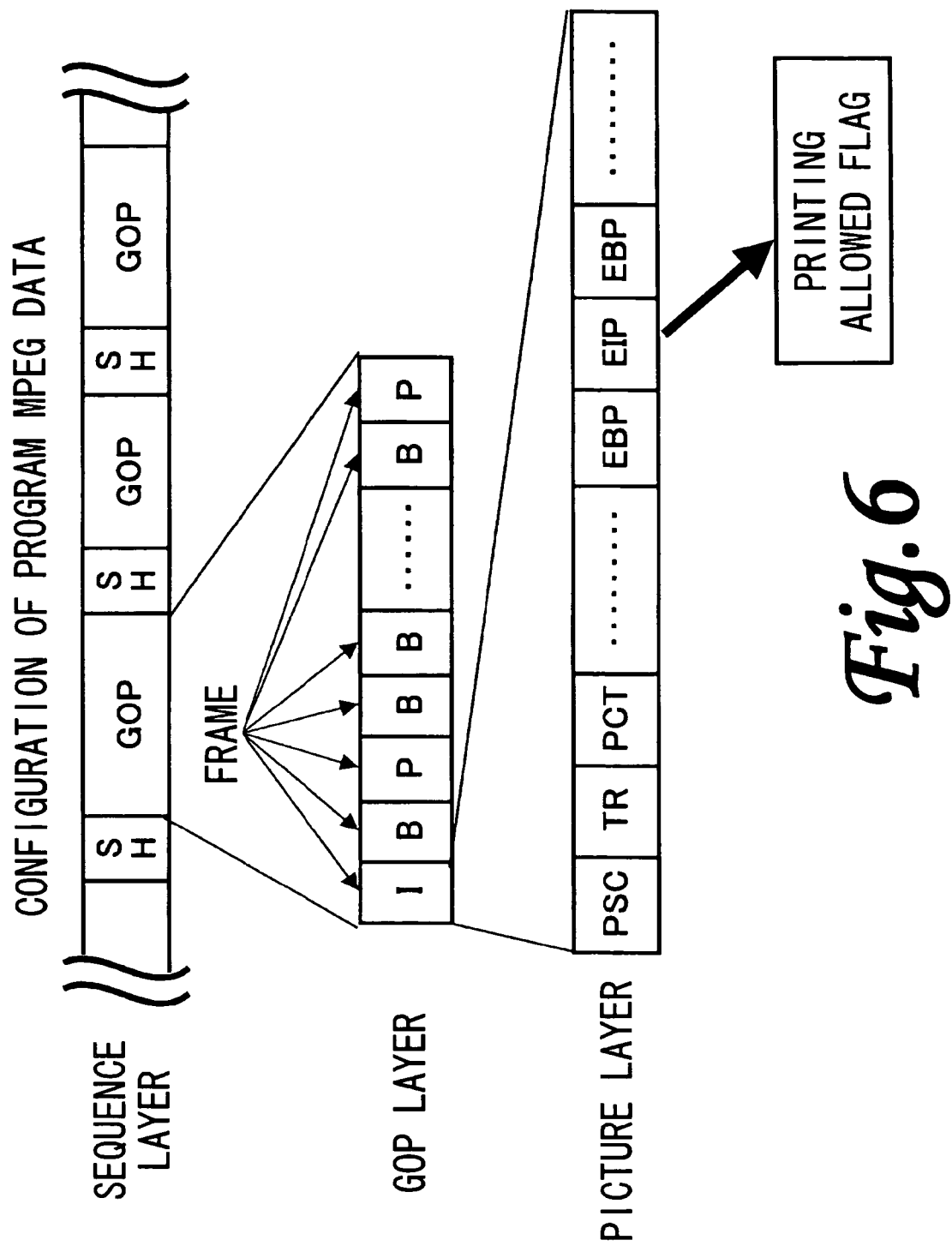
FIG. 6 is a view explaining MPEG data according to the first embodiment of the invention.

FIG. 6 shows details of the above-described program data. The program data can be obtained by coupling and reconfiguration of the program data fields in FIG. 3 which has been described above. As shown in FIG. 6, video data is compressed as a so-called MPEG stream which has been standardized by IEC (International Electrotechnical Commission) 1318 and the like.

Moreover, FIG. 6 shows a sequence layer of the MPEG stream. The sequence layer comprises: a sequence header (SH); and a group of pictures (GOP). This GOP is a set of pieces of related frame image data which are related with one another, and the frame image data is called a picture layer having three kinds of I picture, B picture, and P picture.

This picture layer has a configuration like the picture layer shown in FIG. 3, and a printing-allowed flag is set in an extended area EIP as addition information. Then, the MPEG stream is decoded in the AV decoding section 1103 (see FIG. 4), and, when the frame image is generated, this printing-allowed flag is detected, and is output together with data on the frame image.

The control document according to this first embodiment is a control document for data-broadcasting control, detection for capability of capture printing and control after the detection, message display, and display during capture-allowed time, wherein capture-printing information is described in the control document.

The moving image in this invention is constituted by a plurality of nonmoving images as described above, and both a starting time and an ending time should just be set up.

FIG. 7A shows items of capture printing information. Moreover, FIG. 7B shows the contents according to this first embodiment. In the first place, information on whether capture printing is capable or incapable is described in the capture printing information. In the second place, a control method by which capability or incapability of capture printing is controlled is described in the capture printing information. This control method is selected from control according to the control document, control by reference to external metadata, and control based on the capture printing allowed flag described in EIP of the above-described MPEG stream. In this first embodiment, the control based on the capture-printing allowed flag described in EIP of the MPEG stream is described in the capture printing information.

Moreover, starting time (relative time from the starting time of a program) at which capture printing is allowed, and allowed duration time are described in the capture-printing control information. When there are a plurality of the descriptions in a program, the corresponding number of the starting time and the allowed duration time are described, wherein the corresponding number is in correspondence with the number of the descriptions. Here, it is described in the capture-printing control information according to this first embodiment that capture printing is allowed for 15 minutes from 20 minutes after starting of a program. That is, the nonmoving image forming the moving picture during the above-described time is allowed to be printed. Moreover, the capture-printing control information includes a message adequately displayed according to a control script in this control document and other pieces of information. Here, the printing-allowed image according to the present invention is an image which is allowed to be printed in a case in which a signal by which a part of images forming a moving picture are allowed or disallowed to be printed is included in a moving picture signal. Moreover, the printing-allowed image can be also referred to an image which is prohibited from print. And, in the first embodiment, a printing-allowed flag is set for a part of images which form a moving picture in a program and are allowed to be printed, when the part of images in the program is allowed to be printed.

Moreover, screen data for a captured screen is saved in the data save section 1182 of the TV set 11 according to the instruction of a viewer. FIG. 8 shows a file structure in this case. As shown in FIG. 8, information on captured time (elapsed time after starting of a program), and on whether printing is allowed or disallowed at the captured time, other than a program name described in SI data received when broadcasting is received, is added to captured data as supplementary information.

FIG. 9 shows a structure of the system control section 1191 in the TV set 11, wherein the structure is divided into a plurality of control sections. In FIG. 9, a basic-system control section 1191os is a control section including an OS, and other control sections has a configuration in which a data-broadcasting control section 1191a, a capture control section 1191b, a print control section 1191c, and the other control section 1191d can be operated under control of this basic system control section 1191os.

The data-broadcasting control section 1191a is a so-called bml browser which is operated according to the control document described in the above-described bml document, and control data broadcasting according to the control document. Moreover, presentations of capability of capture printing, display of a message display screen, and the like, which are shown in the above-described FIG. 10, correspond to this bml browser.

When a viewer pushes a capture button on a remote control unit, the capture control section 1191b receives notification by a signal of pushing the button, and controls writing into the capture control section 1135 and the capture buffer memory 1136 for interruption. Moreover, the capture control section 1191b saves data in a capture memory area of the memory section 1151. Various kinds of image corrections are executed by separate operation by a viewer, using capture data saved in the memory section 1151.

Moreover, print GUI for printing-allowed capture data is presented to a viewer, a print file is generated, based on the presentation, and a signal of print instruction is supplied to the print control section 1191c.

The print control section 1191c has a configuration in which, when a signal for print instruction is supplied from the above-described capture control section 1191b, print data is controlled to be generated from the capture data in the memory section 1151, and to temporarily be saved in a print buffer of the memory section 1151. Moreover, the print control section 1191c controls the printer unit 13 through the interface section 1161. And, the print data is forwarded to the printer unit 13 for print control.

The other control section 1191d executes all possible control in the TV set 11, other than control in the above-described control sections. Moreover, detection of the remote control keys in the remote-control unit 12 and notification to the control sections are executed in the other control section 1191d.

Figure 10B:
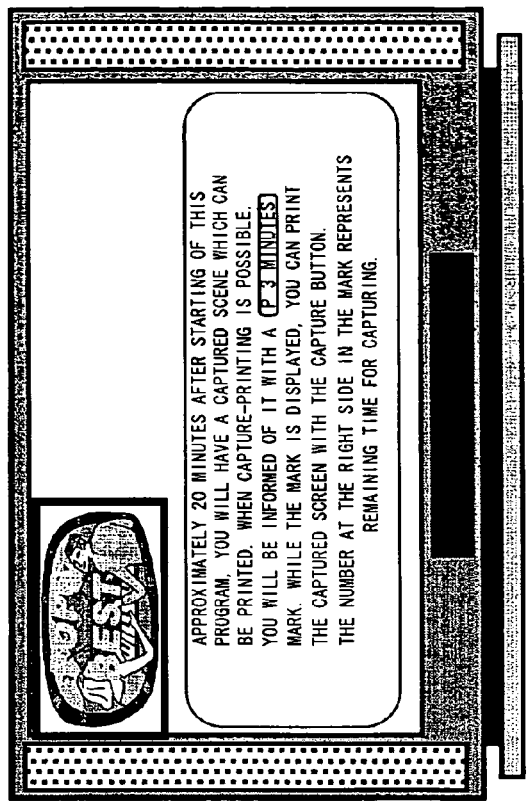
FIG. 10 is a view explaining display for capability of capture printing according to the first embodiment of the invention.
Figure 11A:
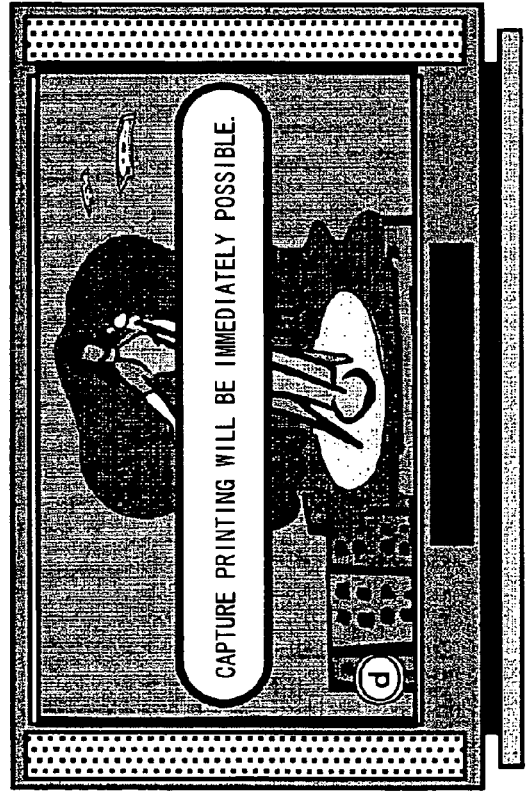
FIG. 11 is another view explaining display for capability of capture printing according to the first embodiment of the invention.

FIG. 11A shows a screen on which, when a program for which capture printing can be executed is started, a message which notifies a viewer that the program is started is displayed. FIG. 10B shows a screen on which more detailed explanation is presented, corresponding to a request of a viewer. Here, the message is also displayed when a program is started to be viewed in the middle of the program.

Figure 11B:

Moreover, FIG. 11A shows a screen which notifies a viewer in the capture-printing capable program that printing-allowed time comes soon. FIG. 11B shows a screen on which, when the printing-allowed time has come, remaining time during which capturing is allowed is presented on the lower right screen in a capture-printing capable program.

Figure 12A:
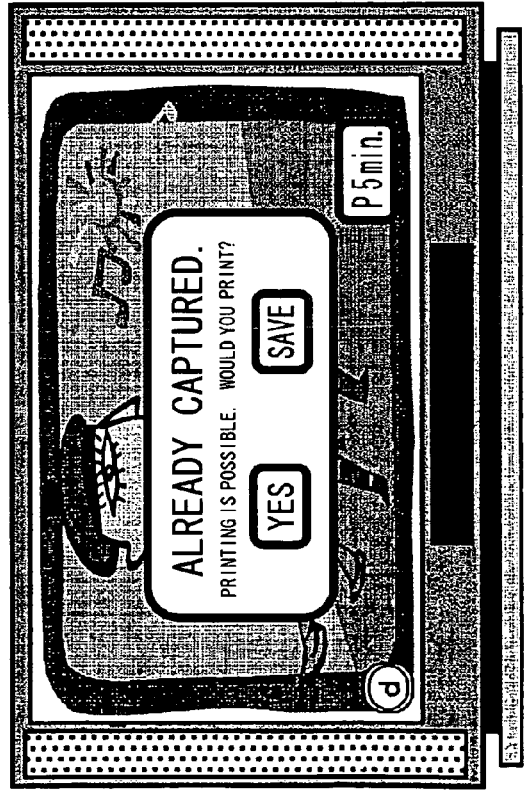
FIG. 12 is a view explaining a screen at operations for capturing according to the first embodiment of the invention.
Figure 12B:

FIG. 12A shows a screen just after a viewer operates capturing within a time during which capture-printing is allowed. That is, completion of capturing and operation GUI for printing are displayed. Moreover, there exists a nonmoving-picture capture function for video in the TV set 11, regardless of whether print is allowed or not. FIG. 12B shows a screen after capturing is operated at a time during which capture printing is not allowed. Here, video received through broadcasting is distinguished in the TV set 11 according to this first embodiment from video which has been photographed with a digital video camera and the like and is displayed, and the video photographed with a digital video camera and the like is controlled so that all types of capture printing are possible.

Subsequently, display and operation according to this first embodiment will be explained, referring to FIG. 13 and FIG. 14.

Figure 13:
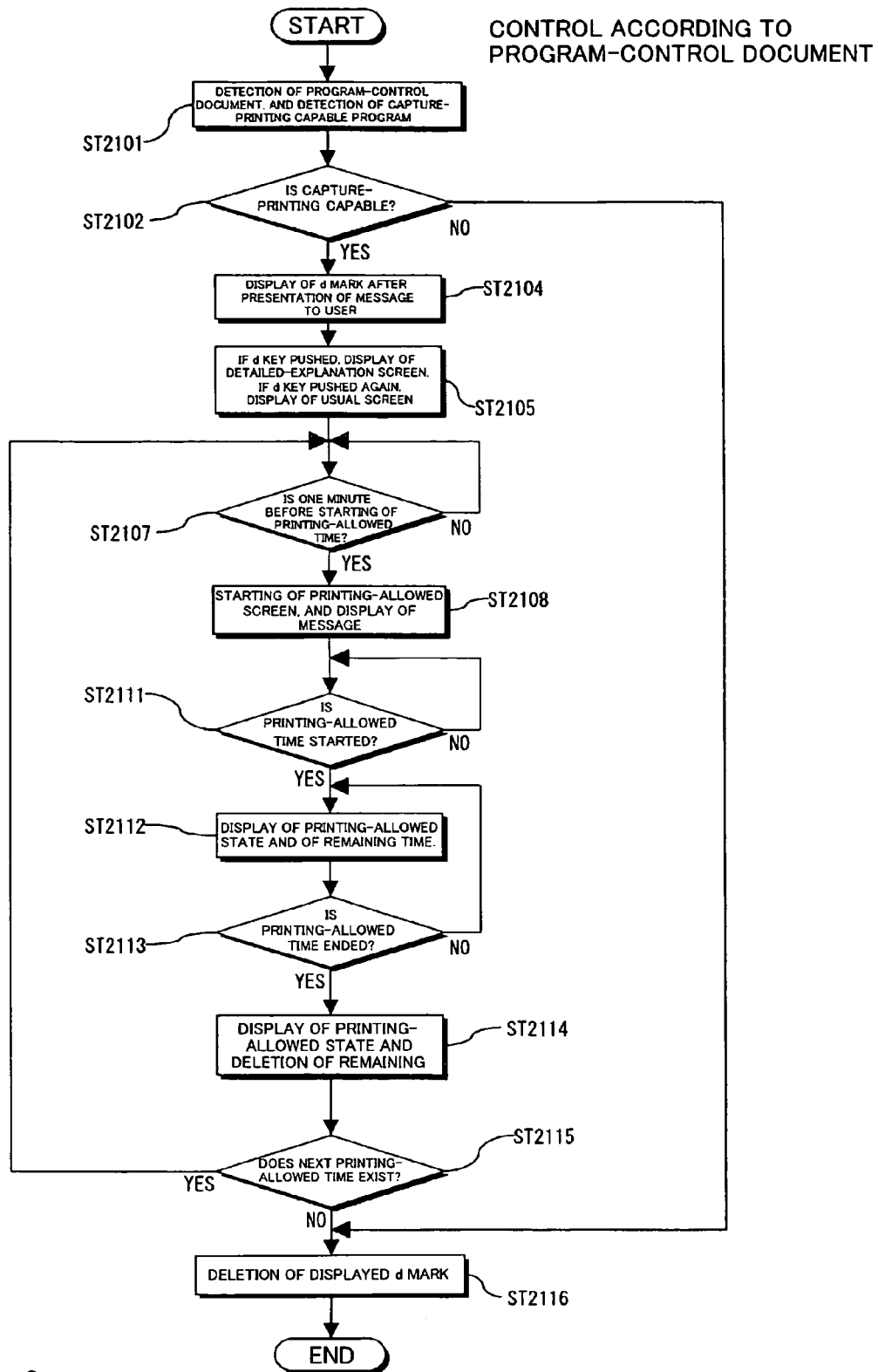
FIG. 13 is a view explaining operations of a program-control document according to the first embodiment of the invention.
Figure 14:
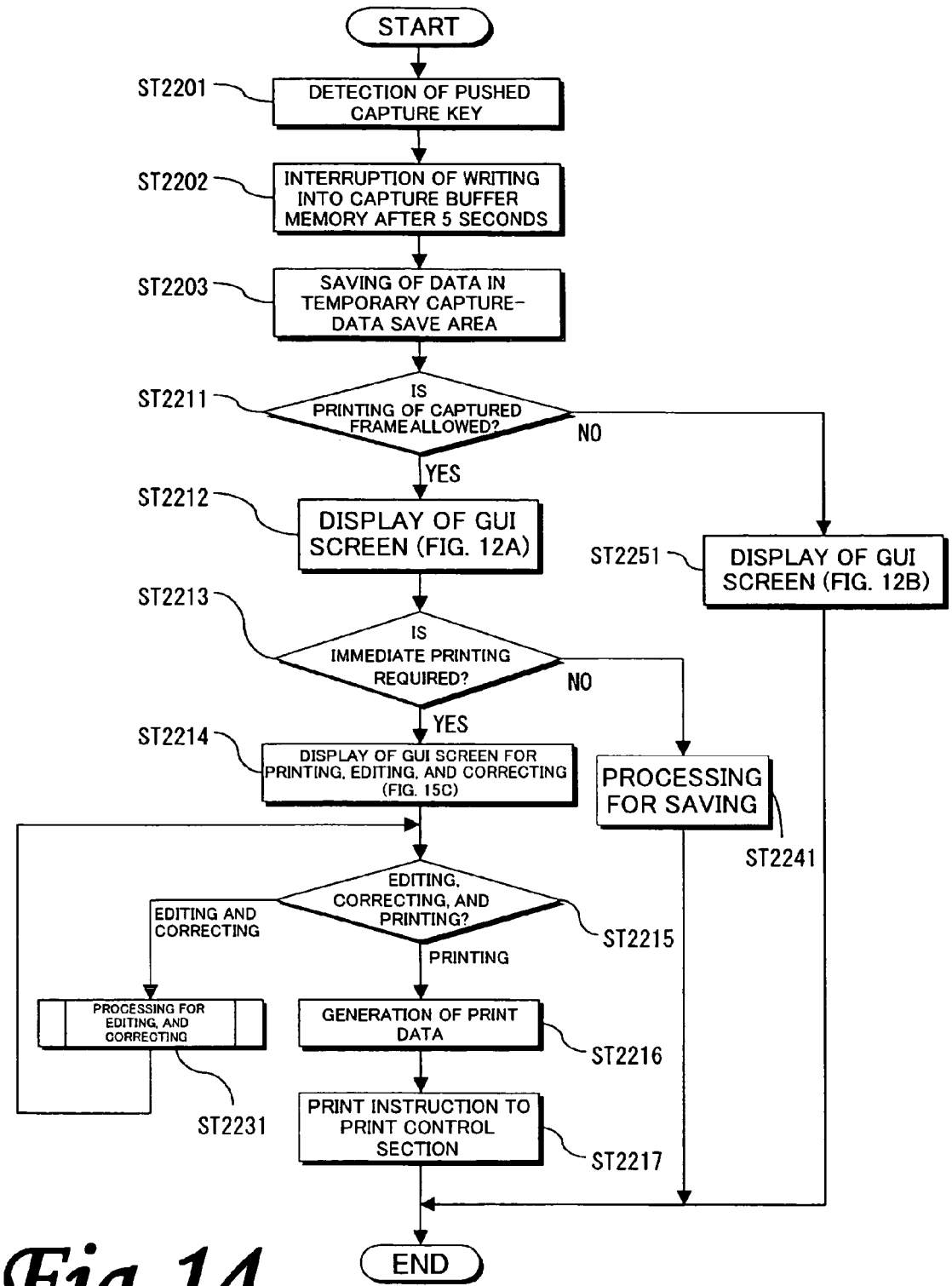
FIG. 14 is a view explaining operations at capturing according to the first embodiment of the invention.

That is, as shown in FIG. 13 and FIG. 14, a capture-printing capable program in this first embodiment is a program for which capture-printing is allowed only for 15 minutes from 20 minutes after starting of the program. At this time, messages and GUI screens are supplied to a viewer as shown in FIG. 10 and FIG. 11.

Figure 10A:
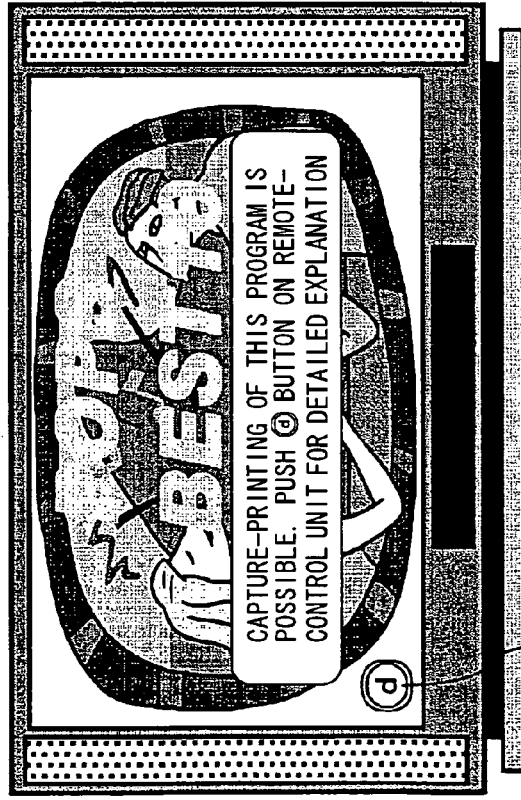

Moreover, in a state in which messages shown in FIG. 7B are displayed as print control information, there is made a script by which "when the d key is pushed in a state in which messages shown in FIG. 10A presenting a capture-printing capable program are displayed, control for display of a detailed message screen as shown in FIG. 10B is executed", and "capture-printing-allowed time, and allowed duration time are detected, a screen shown in FIG. 11A is displayed one minute before a time at which capture printing is allowed, and an icon and remaining time is displayed when a time at which capture printing is allowed has come". Subsequently, the above-operations are integrated into a program control document.

In the first place, when a program recorded in the recording reproduction section 2101 is read by operation of an editor and capture-printing-allowed time is decided in the above-described broadcasting apparatus 21, the edit section 2122 records printing-allowed information in EIP of a frame for which capture printing is allowed with regard to a MPEG stream of a program in the recording reproduction section 2101.

Therewith, capture-printing control information is made, and is saved in the print-information save section 2102. On the other hand, a program-control document is made together with a control script, and various kinds of messages, and is saved in the additional-information save section 2103.

Moreover, when a program starting time has come, the output control section 2121 in the broadcasting apparatus 21 controls: the recording reproduction section 2101; the print-information save section 2102; the additional-information save section 2103; and, the synthesis section 2110 to generate broadcasting data and to start sending of the data.

Then, at the viewer side, broadcasting data shown in FIG. 3 is received and demodulated in the tuner section 1101 after the power supply of the TV set 11 is turned on. Subsequently, the broadcasting data is separated in the data separation section 1102 into the above-described program data and the data broadcasting data, which have been described above.

Moreover, the program data is decoded in the AV decoding section 1103. Video is displayed on the display section 1134 through the display synthesis control section 1133. Moreover, audio is output from the audio output section 1122 through the audio control section 1121.

On the other hand, the broadcasting data are separated into data broadcasting data and other data in the data separation section 1102, and the separated data broadcasting data and other data are reserved in the memory section 1151 as described above. At this moment, it is assumed that the above-described capture-printing capable program is started. FIG. 13 shows procedures for control according to the program-control document after starting of this capture-printing capable program.

As shown in FIG. 13, the data-broadcasting control section 1191a detects and analyzes the program control data of the above-described program at a step ST2101. Thereafter, the above-described control script, and the capture-printing information having the contents shown in FIG. 7B are detected.

Then, at a step ST2102, it is inquired of the capture control section 1191b whether the TV set 11 is capable of capture printing.

In this first embodiment, assuming that capture printing is capable, the screen shown in FIG. 10A is displayed, and a viewer is notified of that capture printing is possible according to the control script. Here, the above display is deleted after the display is continued for, for example, several seconds. Thereafter, the processing proceeds to a step ST2104, at which a d-mark icon is displayed at the bottom left corner of the screen. Thereby, the viewer is notified of that there exists some data broadcasting.

Subsequently, when a viewer pushes the d key 1201 on the above-described remote-control unit 12 for details, the other control section 1191d detects that the d key 1201 is pushed, and a notification signal is supplied to the data-broadcasting control section 1191a.

Thereafter, the data-broadcasting control section 1191a which has detected that the d key is pushed displays the messages shown in FIG. 10B at a step ST2105. The messages are deleted by pushing the above-described d key 1201, and the processing returns to a usual view screen.

Here, as operations at steps ST2104 and ST2105 are usual processing by which data broadcasting is presented, similar processing is executed even in a case other than such a case. Moreover, when the d key 1201 is pushed in a case other than the above-described case, messages and data broadcasting screens are displayed according to the timing. And, when the TV set 11 is not capture-printing capable, the processing proceeds to a step ST2102. Thereafter, no processing is executed, and the processing is ended.

Moreover, when the processing proceeds to a step ST2107, at which, when the data-broadcasting control section 1191a detects capture-printing-allowed time in capture-printing information, display elapsed time of a program is started to be compared with the capture-printing-allowed time of the program. Moreover, the display elapsed time may be calculated according to time.

Then, the processing proceeds to a step ST2108, at which according to time information indicating the display elapsed time, a message, for example, as shown in FIG. 11A, that a printing-allowed image will be displayed is displayed at one minute before display of the image. This message is automatically deleted in several seconds. Here, the information of time includes not only elapsed time during which a program is reproduced, wherein the elapsed time is measured from the start of a displayed program, but also elapsed time of the program calculated according to current time.

Then, the processing proceeds to a step ST2111, at which, when capture-printing-allowed time has come after predetermined time passes, the processing proceeds to a step ST2112. At the step ST2112, an icon indicating that printing has been allowed is displayed as shown in FIG. 11B. A number in this icon indicates printing-allowed remaining time.

Thereafter, the processing proceeds to a step ST2113, at which, when the printing-allowed time is over, the processing proceeds to a step ST2114. At the step ST2114, the above-described icon is deleted, and a viewer is notified of that the capture-printing-allowed time is over. Subsequently, the processing proceeds to a step ST2115, at which it is detected whether there exists the next printing-allowed time.

When there is the printing-allowed time, the processing returns to the step ST2107, at which the printing-allowed time is detected. Thereafter, when the capture-printing-allowed time is over, the processing proceeds to step ST2116, at which the d mark is deleted and the processing is ended. Here, in the MPEG stream of a program, it is described in a printing-allowed flag in EIP of a frame corresponding to the above-described capture-printing-allowed time that printing is allowed.

On the other hand, FIG. 14 shows a flow of operations when a viewer pushes a capture key on the remote-control unit 12 within the capture-printing-allowed time.

In the first place, at a step ST2201, a notification that the capture key has been pushed is supplied from the other control section 1191d to the capture control section 1191b. Thereafter, the processing proceeds to a step ST2202, at which, according to this notification that the capture key has been pushed, writing into the capture control section 1135 is interrupted, and, at the same time, writing into the capture buffer memory 1136 is interrupted after the writing into the memory 1136 is maintained for five seconds.

Subsequently, the processing proceeds to a step ST2203, at which the above data, together with the program name, the capture time, and the printing-allowed flag, are saved in a temporary capture-data save area of the memory section

1151. Thereby, data which is included during a total of ten seconds before and after the capture time is saved in the memory section 1151.

Subsequently, the processing proceeds to a step ST2211, at which a capture-printing allowed flag in EIP of a captured frame is detected. When it is confirmed in the capture control section 1191b that the capture-printing allowed flag is in a printing allowed state, the processing proceeds to a step ST2212, at which the GUI screen shown in FIG. 12A is displayed. Thereby, a viewer is notified of that capturing has been completed, and printing can be executed. Therewith, on the displayed GUI screen, a viewer is requested to select immediate starting of printing ("YES" button), or saving of the capture data ("saving" button). Then, the processing proceeds to a step ST2213, at which selected option by the viewer is detected.

Figure 15A:
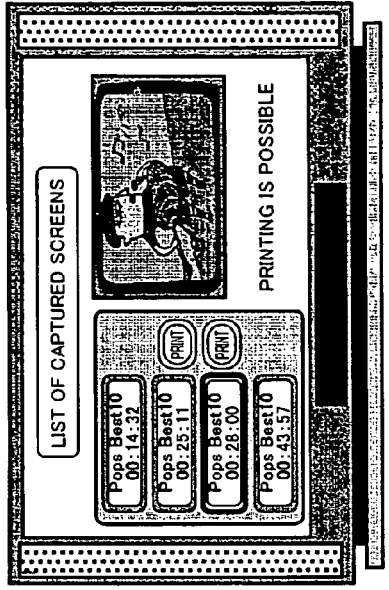
FIG. 15 is a view explaining operations after saving according to the first embodiment of the invention.
Figure 15B:
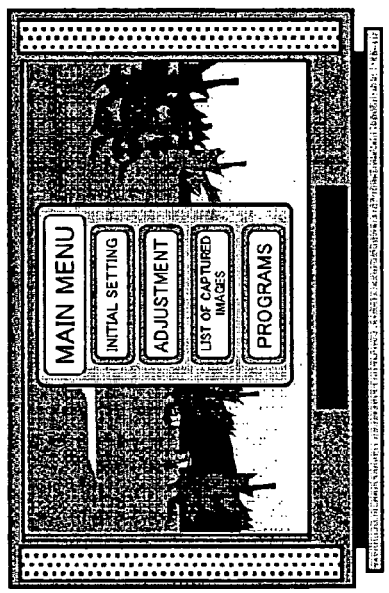
Figure 15C:
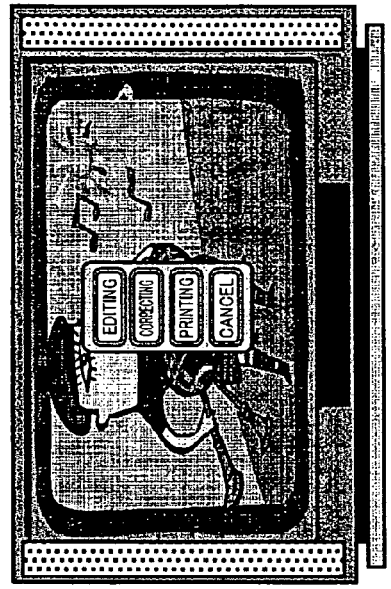

When, at a step ST2213, the viewer pushes the "YES" button through which printing is immediately started, the processing proceeds to a step ST2214, at which a GUI screen, as shown in FIG. 15C, for editing, correcting, and printing is displayed for a viewer. Then, the processing proceeds to a step ST2215, at which an input screen for a viewer is displayed.

Here, when a viewer pushes an editing button, operations and processing for display and selection (editing and correcting processing) can be performed with regard to frames, which have been saved in the memory section 1151, for a total of five seconds before and after a frame which has been captured with right and left cursor keys and displayed. Moreover, when a correction button is pushed, processing by which the image quality of a nonmoving picture is improved, for example, blur correction is executed for a plurality of frames before and after a displayed frame.

As described above, an image to be printed is decided, and, when a printing start button is pushed at the step ST2215, the processing proceeds to a step ST2216, at which print data is generated, using display frame data.

Thereafter, the processing proceeds to a step ST2217, at which a signal for print instruction is supplied to the print control section 1191c to end processing for capture application. Subsequently, the print control section 1191c, to which the print instruction has been supplied, controls the printer unit 13 through the interface section 1161 to forward print data to the printer unit 13 for printing. Moreover, a GUI panel is displayed as required, and a state in which a request from a viewer is met can be realized.

On the other hand, when the saving button is pushed at the above-described step ST2213, the processing proceeds to a step ST2241, at which, a program name, capture time, and printing allowed information are added to the capture data, as shown in FIG. 8, for saving in the data save section 1182. And, processing for capture application is ended.

FIG. 15 shows screens through which, after capture data is saved at the step ST2241, the saved capture data is read, displayed and printed again.

FIG. 15A shows a state in which, in the first place, a viewer pushes a menu key to display a menu screen. Subsequently, when the viewer selects and decides a captured-screen list, a captured image list is displayed, as shown in FIG. 15 B. Captured programs and time are displayed in the list, and an image selected with the cursor key on the remote control unit is displayed at the right side of the list. Here, when the viewer selects and decides any one of images, the selected image is enlarged, and a GUI screen for above-described editing, correcting, and printing is displayed as shown in FIG. 15C. Then, as the viewer selects and decides any one of displayed processing, similar processing to the above-described editing, correcting, or printing can be executed.

Here, when it is detected at the step ST2211 that a capture-printing allowed flag does not exist in EIP after capturing is completed, or, printing is prohibited even if the capture-printing allowed flag exists, the processing proceeds to a step ST2251, at which a capture completion message including a message that printing is not allowed is displayed as shown in FIG. 12B, and the processing is ended.

As described above, capture-printing can be allowed, and controlled with regard to images, among broadcast images, for which capture-printing is allowed. Thereby, as a program control document provides only existence of allowed capture-printing, and the capture time to a viewer, and management for actual printing is not required, simple control can be realized, and, at the same time, control by which capture printing is allowed or disallowed in frames can be executed. Moreover, it is possible to present, while broadcasting, that an image for which capture printing is allowed is displayed. Thereby, capture printing can be realized while a broadcasting program is viewed to improve the convenience.

In this first embodiment which has been explained above, data to be added to a capture image has been acquired from SI data. As SI information is forwarded as supplementary information for program data, the capacity of the SI information is limited. Accordingly, detailed information such as information on each scene is not forwarded, and information on, for example, a program name is only added to the capture image. Then, a case in which more data is added will be explained in the following second embodiment.

Second Embodiment

Subsequently, a broadcasting system according to a second embodiment of the present invention will be explained. Here, a case in which segment metadata is used will be explained as one example in the second embodiment. Moreover, as a configuration of an apparatus is similar to that of the first embodiment shown in FIG. 1 through FIG. 5, explanation will not be repeated. Moreover, metadata is a generic name of attribute information corresponding to data.

Metadata as a video and audio program has been examined in an international standardization group called a TV Anytime Forum (hereinafter, called TVAF), ARIB, and the like. Moreover, one of descriptive schemes for the metadata is MPEG7, and the above-described TVAF has been also examined, based on MPEG 7.

The metadata related with a program has three kinds. A first one is contents metadata. This metadata is corresponding to the whole program, and describes a program title, the genre of the program, the summary, performers, and the like. Things similar to those obtained from SI information forwarded as broadcasting data are included. A second one is an instance metadata.

This metadata describes the contents of: information on a place to obtain a program; an expiration date for reproduction; charging information; and use convention. Moreover, a third one is segment metadata. This segment metadata is a descriptive document in scenes, wherein the document describes information according to which access to, or operation of a specific scene (segment) in video and audio of a program can be realized. Moreover, the segment data is forwarded to a receiving side simultaneously with the program or differently from each other.

Video and audio can be reconfigured outside the framework of a program according to various kinds of viewing forms by appropriate control, for example, digest reproduction, batch reproduction by genre, multi-scenario reproduction can be realized. Scene retrieval and the like can be also executed by the metadata. Moreover, there is consumer metadata too, other than the above kinds of metadata. This metadata, different from the other metadata, is not incidental to a program, and is generated at the receiving side. Moreover, the metadata comprises the contents such as a viewing history, and preference information of a viewer, and is used for, for example, recommendation of programs by a TV set for a viewer.

Figure 16:
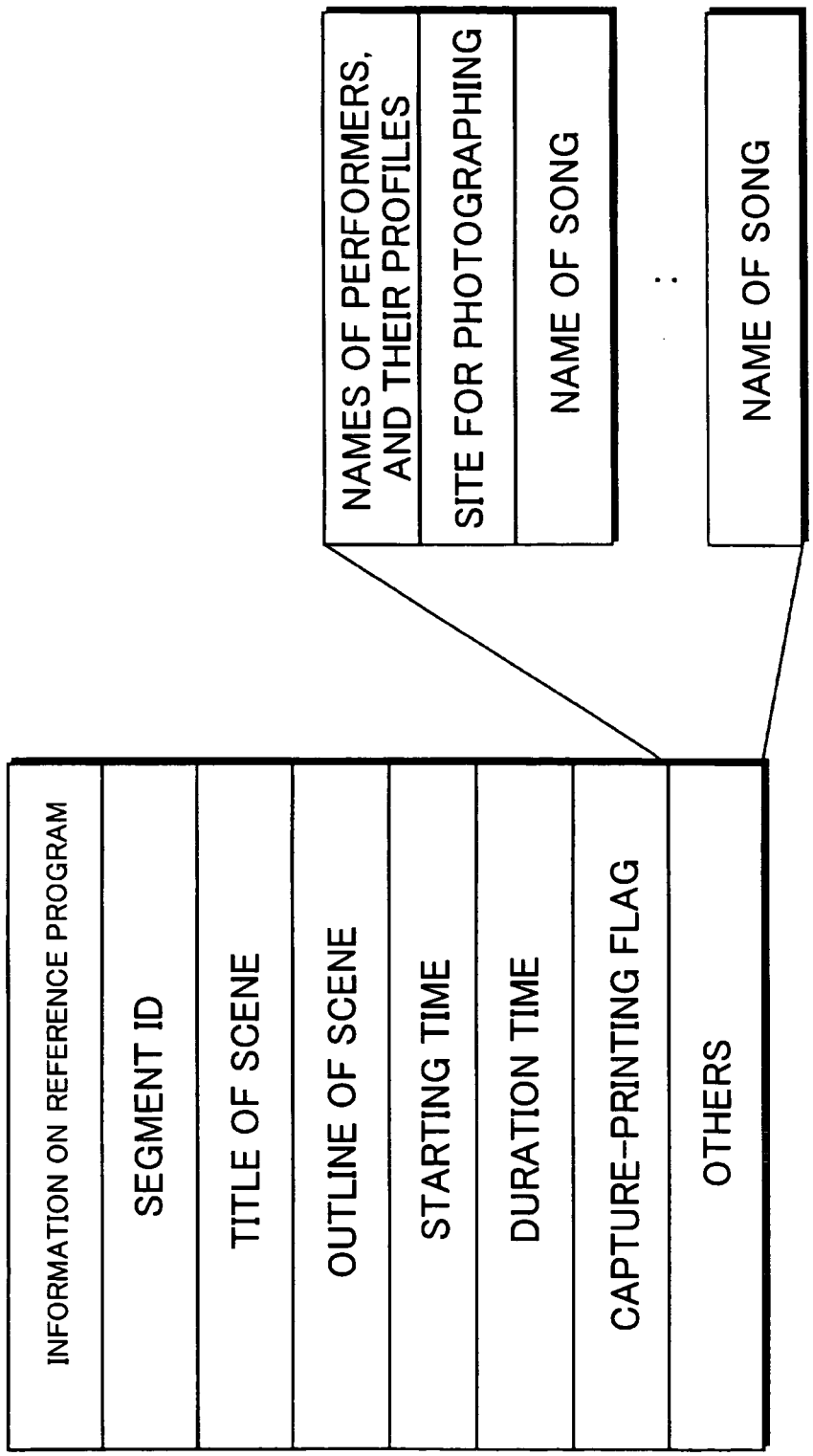
FIG. 16 is a view explaining a segment metadata according to a second embodiment of the invention.

FIG. 16 shows a configuration of the segment metadata used in the second embodiment. The configuration of this segment metadata adheres to the TVAF and the MPEG7 standards.

The segment metadata includes information (CRID) on basic reference programs, which forms a scene, a segment ID of the segment metadata, a scene title of the scene, the outline of the scene, starting time of the scene, duration time of the scene, and, additionally, a free key word, and a capture-printing allowed flag is described as one example in the present example. And, a site for photographing, names of performers, their profiles, names of songs, and the like are described as other free key words.

Moreover, according to this second embodiment, data of six scenes with a segment ID of S001 through S006 is described, as shown in FIG. 17, in the segment metadata with regard to received programs. In the first place, these segment metadata is made by those who edit the programs, and is saved in an Internet server section 2112 of an broadcasting apparatus 21.

Moreover, when a program is received, a program-control document including a control script by which the above-described segment metadata is down-loaded from the Internet server 2112, and capture printing control information with a configuration in which "stream allowed flag and segment metadata" is set as an item of a control method of capture-printing control information, as shown in FIG. 7 is saved in a additional-information save section 2103.

Then, operations in the second embodiment will be explained, referring to FIG. 13 and FIG. 19.

That is, in the first place, when a program starting time has come, an output control section 2121 in the broadcasting apparatus 21 synthesizes and start to transmit program control data including program data and printing-allowed information, as shown in FIG. 13, in a similar manner to that of the first embodiment. Then, a data-broadcasting control section 1191a of the TV set 11, which has received the program control data, detects the above-described program control data at a step ST2101 in a similar manner to that of the first embodiment.

Subsequently, the program is analyzed to detect the control script which includes a down-loading command for the above-described segment metadata, and capture printing control information with a configuration in which "stream allowed flag and segment metadata" is set as an item of a control method.

Then, at a step ST2102, it is inquired of a capture control section 1191b whether the TV set 11 is capable of capture printing.

At the same time, the downloading command for the segment metadata is detected from the control script to control an Internet connection section 1171. And, the Internet connection section 1171 is connected to the Internet server section 2112 to download the segment metadata shown in FIG. 17, and the segment metadata is saved in a memory section 1151.

Subsequently, presentation to a viewer is executed according to steps ST2104 through ST2116, which are shown in FIG. 13 in a similar manner to that of the first embodiment.

Figure 19:
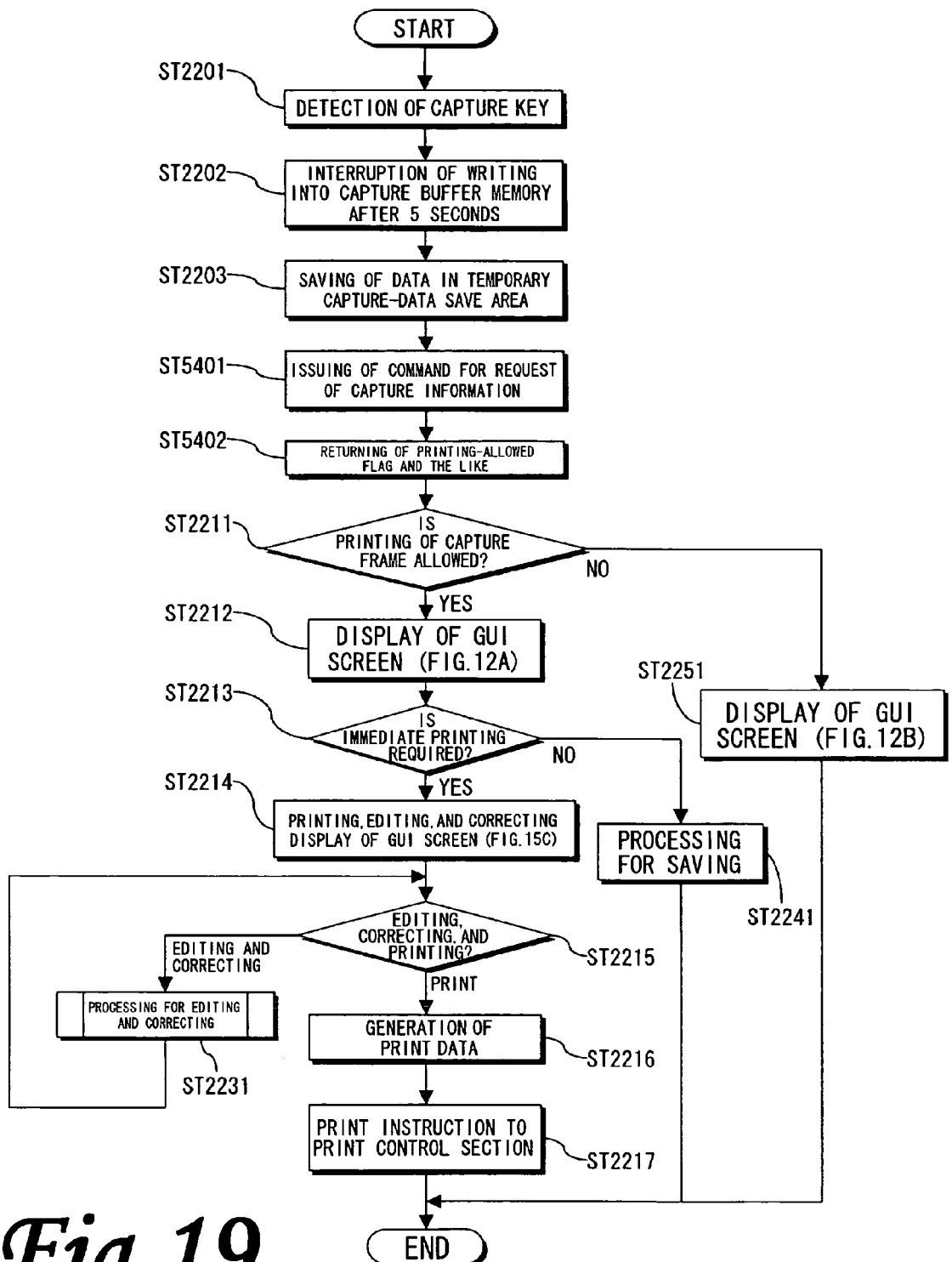
FIG. 19 is a view explaining capturing operations according to the second embodiment of the invention.

On the other hand, FIG. 19 shows a flow of operations when a viewer pushes a capture key on a remote-control unit within the capture-printing-allowed time.

At a step ST2201, a notification that the capture key has been pushed is supplied from the other control section 1191d to the capture control section 1191b. And, in a similar manner to that of the first embodiment, at a step ST2202, writing into a capture control section 1135 is interrupted, and, at the same time, writing into a capture buffer memory 1136 is interrupted after the writing into the memory 1136 is maintained for a predetermined time, for example, five seconds.

Figure 18:
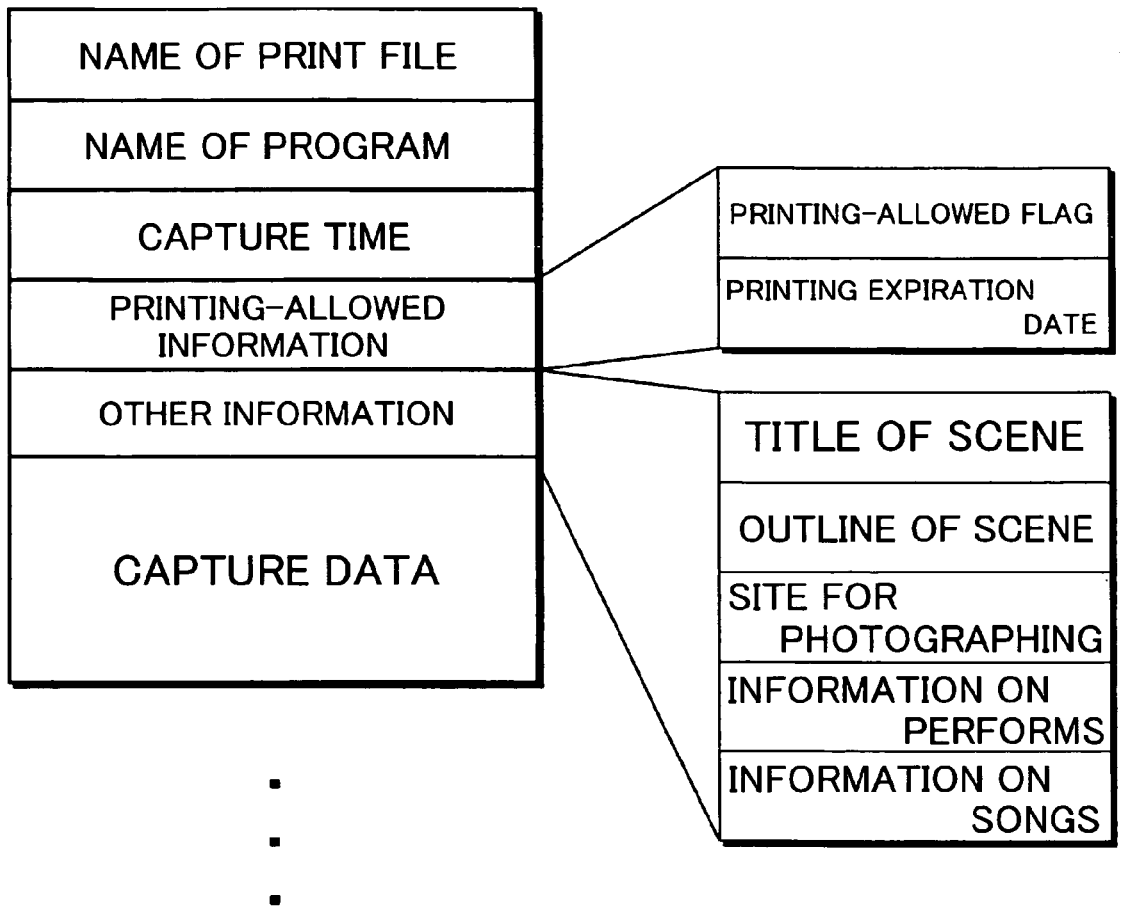
FIG. 18 is a view explaining a capture file at saving according to the second embodiment of the invention.

Thereafter, at a step ST2203, the above data, together with the capture time, is saved in a temporary capture-data save area of the memory section 1151. FIG. 18 shows the contents of a capture file when capture data is saved in the TV set 11 according to this second embodiment. The name of a scene, the outline of the scene, a site for photographing, information on performers (names, profile, and the like), information on music (names of songs, names of song writers, names of musical composers, and the like) are extracted from a corresponding segment metadata for a captured image, and the above information is saved as a part of the capture file for the other information.

Thereafter, at a step ST5401, the capture time for the data-broadcasting control section 1191a is set as an argument to issue a command by which capture information is inquired.

Responding to the issued inquiry command, the data-broadcasting control section 1191a reads the segment metadata, other than the name of the program, corresponding to the capture time from the memory section 1151 for retrieval, using the capture time, at a step ST5402, and the printing-allowed flags for the printing-allowed information and the segment metadata, the name of the scene, the site for photographing, the names of performers, the profiles of the performers, and the names of songs are returned to the capture control section 1191b.

Then, if the returned printing-allowed flag for the capture information is printing-allowed at a step ST2211, the capture control section 1191b displays a GUI screen as shown in FIG. 12A at a step ST2212 to notify a viewer of that the capturing is completed and of whether printing is allowed. At the same time, on the displayed GUI screen, a viewer is requested to select immediate starting of printing ("YES" button), or saving of the capture data ("saving" button) at a step ST2213.

Operations after starting of printing is selected are similar to steps after the step ST2212 shown in FIG. 14, which have been explained in the first embodiment.

On the other hand, when a saving button is pushed at the step ST2213, the processing proceeds to a step ST2241, at which, segment meta information supplied from the data-broadcasting control section 1191a, other than a program name, capture time, and printing allowed information, are added to the capture data, as shown in FIG. 18, for saving in a data save section 1182.

Figure 20:
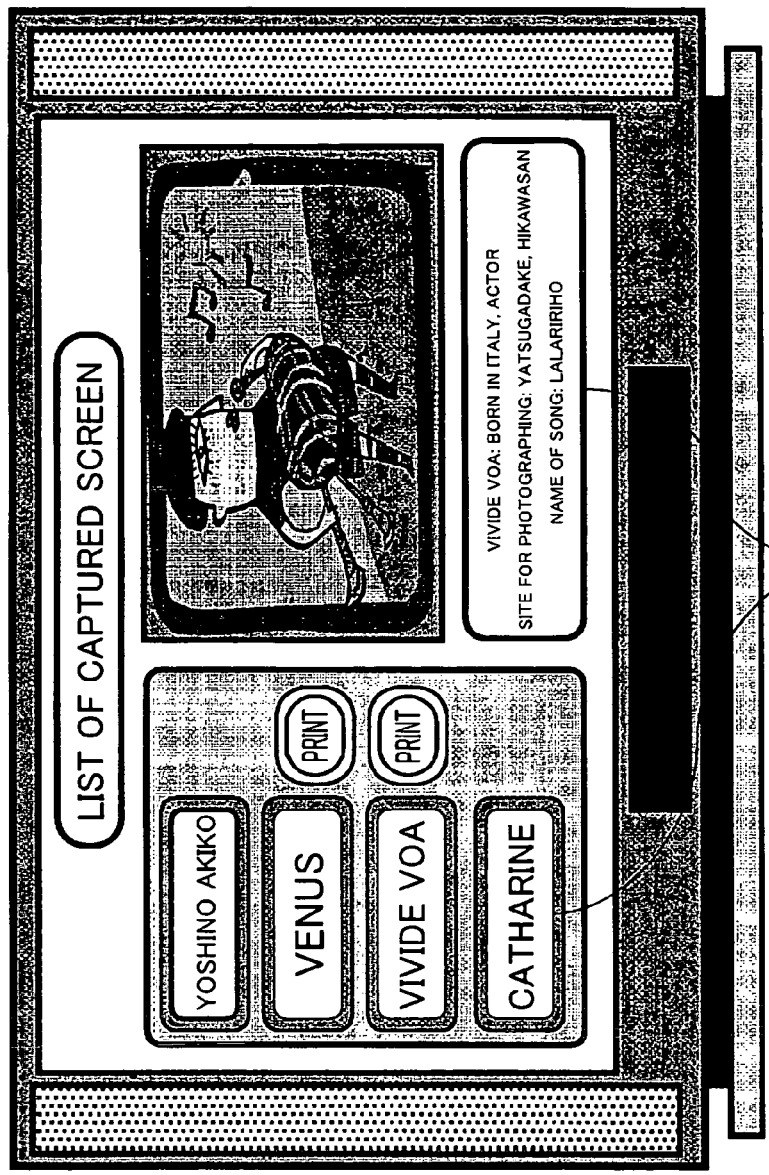
FIG. 20 is a view explaining a list after saving according to the second embodiment of the invention.

Then, the files saved at the step ST2241 are assumed to be displayed again, and printing-allowed files among the saved files can be printed. FIG. 20 shows a displayed screen of a list for saved capture screens, wherein the list is used when the saved capture data is read again for display and printing. FIG. 20 corresponds to FIG. 15B which have been explained in the first embodiment.

Moreover, when files are captured and saved, neither program names nor capture time, but the scene name, names of performers, names of songs, and the like can be also displayed outside the image frame on the capture screen list, because the contents shown in FIG. 18 are saved.

By the above-described display, a viewer can easily print images which the viewer wants to print, because captured images are easily distinguished.

Thus, images which a viewer wants to print can be selected, using the above list, and, at the same time, editing, correcting, and the like are executed, and printing is performed in a similar manner to that of the first embodiment.

Though the embodiments according to the present invention have been specifically explained as described above, this invention is not limited to the above-described embodiments, and various kinds of modifications can be made, based on the technical idea of the present invention.

For example, the contents of data or the displayed screens in the above-described embodiments are shown only for one example, and, contents of the data or screens to be displayed, which are different from those shown in the first embodiment, may be used as required.

Moreover, it is also possible to control capture-printing according to a program-control document, based on a configuration in which capture-printing is controlled according to segment metadata which has been explained in the second embodiment in above-described first and second embodiments. In this case, capability or incapability of capture printing is controlled, depending on whether a captured image is within printing-allowed time, or allowed duration time in capture printing control information.

Other than the operations in the second embodiment, there can be applied another configuration in which a TV set videotapes a broadcast program, segment metadata in a broadcasting apparatus 21 is updated at an arbitrary timing after broadcasting, and segment metadata is downloaded from the broadcasting apparatus 21 in a broadcasting station when the videotaped program is reproduced with the TV set. According to the above-described operations, the latest printing-allowed information can be reflected on a program when the program is reproduced after the program is videotaped. The above reflection can be realized, for example, when printing is prohibited by some reasons, though capture printing has been set as allowed just after broadcasting, or when the expiration date of allowed capture-printing is extended for a certain limited scene, based on requests by a large number of viewers. Moreover, when a broadcasting date depends on locations, the above expiration can be updated, depending on broadcast locations.

Figure 21:
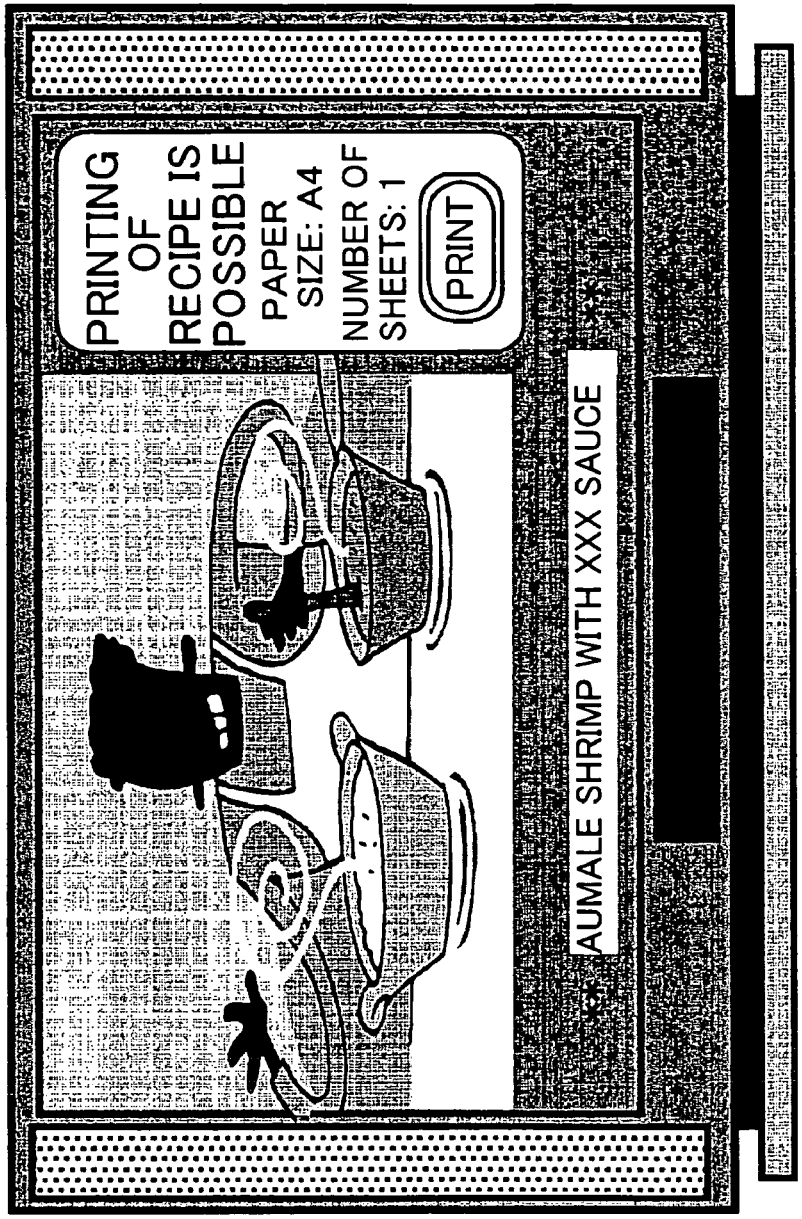
FIG. 21 is a view explaining a data-broadcasting screen according to the second embodiment of the invention.

Though the above-described capturing has been described, assuming as one example that the capturing is applied for moving pictures, there can be also applied another configuration, for example, in which an image is captured, and, at the same time, program control data controlling a displayed screen is saved together, and a captured screen for video, or a data-broadcasting screen is selected at printing for displaying and printing, when the screen, as shown in FIG. 21, displaying data through data broadcasting is captured at viewing.

Moreover, though, according to the above-described embodiments, it is presented to a user by superimposing a message on a screen that a printing-allowed image for a user is displayed, a method presenting information to a user is not necessarily limited to the method by which the information is displayed on a screen, and another method can be also applied. For example, by output sounds or audio from a speaker provided in a TV set or by flashing lamps (for example, indicator lamps) provided in an apparatus, it can be presented to a user that a part of moving pictures in a program have been allowed to be printed, or that a part of moving pictures in a program have been disallowed to be printed.

Though the embodiments according to the present invention have been specifically explained as described above, this invention is not limited to the above-described embodiments, and various kinds of modifications can be made, based on the technical idea of the present invention. For example, the numerical values in the above-described embodiments have been shown only for one example, and, other values, which are different from those shown in the above embodiments, may be used as required.

Preferably, the present invention is applied to cases in which a program including moving pictures, only a part of which is allowed to be printed, is displayed, but the invention is not necessarily limited to the above cases.

This application claims priority from Japanese Patent Application No. 2004-169801 filed Jun. 8, 2004, and Japanese Patent Application No. 2005-124784 filed Apr. 22, 2005, which is hereby incorporated by reference, herein.

What is claimed is:

1. A signal processing apparatus comprising:
a receiving unit that receives data including data-broadcasting data and video data for displaying a moving picture on a display screen of a display device, wherein the data-broadcasting data includes capture printing control information which comprises information relating to a period of time for which capture printing of the moving picture based on the video data is allowed in a broadcast program;
a display control unit that synthesizes display data for displaying information indicating that the capture printing of the moving picture is to be allowed with the video data, based on the capture printing control information, and outputs the synthesized data to the display device;
a detecting unit that detects printing-allowed information set in a picture layer of a captured frame of the video data when capturing is instructed by a user; and
a capturing control unit that stores video data of the captured frame as a still picture into a storing unit when the printing-allowed information is detected.

2. A signal processing apparatus according to claim 1, wherein the video data is in MPEG stream format, and the printing-allowed information is set in a picture layer of the MPEG stream.

3. A signal processing apparatus according to claim 1, wherein the display data includes data for displaying at least one of information on whether capture printing is allowed or disallowed, information on when the capture printing is to be allowed, and information on a remaining time allowed for capture printing.

4. A signal processing apparatus according to claim 1, wherein the capture printing control information includes a starting time at which capture printing is allowed relative to a staffing time of the broadcast program and an allowed duration time.

5. A signal processing method comprising the steps of:
using a signal processing apparatus to perform steps of:
receiving broadcasting data including data-broadcasting data and video data for displaying a moving picture on a display screen of a display device, wherein the data-broadcasting data includes capture printing control information which comprises information relating to a period of time for which capture printing of the moving picture based on the video data is allowed in a broadcast program;

synthesizing display data for displaying information indicating that the capture printing of the moving picture is to be allowed with the video data, based on the capture printing control information, and outputting the synthesized data to the display device;

detecting printing-allowed information set in a picture layer of a captured frame of the video data when capturing is instructed by a user; and storing video data of the captured frame as a still picture into a storing unit when the printing-allowed information is detected.

* * * * *